(12) United States Patent
Langhammer et al.

(10) Patent No.: US 9,063,870 B1
(45) Date of Patent: Jun. 23, 2015

(54) LARGE MULTIPLIER FOR PROGRAMMABLE LOGIC DEVICE

(71) Applicant: Altera Corporation, San Jose, CA (US)

(72) Inventors: Martin Langhammer, Salisbury (GB); Kumara Tharmalingam, Los Gatos, CA (US)

(73) Assignee: Altera Corporation, San Jose, CA (US)

( * ) Notice: Subject to any disclaimer, the term of this patent is extended or adjusted under 35 U.S.C. 154(b) by 359 days.

(21) Appl. No.: 13/743,819

(22) Filed: Jan. 17, 2013

Related U.S. Application Data

(60) Division of application No. 11/682,787, filed on Mar. 6, 2007, now Pat. No. 8,386,553, which is a continuation-in-part of application No. 11/566,982, filed on Dec. 5, 2006, now Pat. No. 7,930,336.

(51) Int. Cl.
*G06F 7/53* (2006.01)
*G06F 17/10* (2006.01)

(52) U.S. Cl.
CPC .............. *G06F 17/10* (2013.01); *G06F 7/5324* (2013.01)

(58) Field of Classification Search
CPC .................................................... G06F 7/5324
See application file for complete search history.

(56) References Cited

U.S. PATENT DOCUMENTS

| | | | |
|---|---|---|---|
| 3,473,160 A | 10/1969 | Wahlstrom | |
| 4,156,927 A | 5/1979 | McElroy et al. | |
| 4,179,746 A | 12/1979 | Tubbs | |
| 4,212,076 A | 7/1980 | Conners | |
| 4,215,406 A | 7/1980 | Gomola et al. | |
| 4,215,407 A | 7/1980 | Gomola et al. | |
| 4,422,155 A | 12/1983 | Amir et al. | |
| 4,484,259 A | 11/1984 | Palmer et al. | |
| 4,521,907 A | 6/1985 | Amir et al. | |
| 4,575,812 A | 3/1986 | Kloker et al. | |
| 4,597,053 A | 6/1986 | Chamberlin | |
| 4,616,330 A | 10/1986 | Betz | |
| 4,623,961 A | 11/1986 | Mackiewicz | |
| 4,682,302 A | 7/1987 | Williams | |

(Continued)

FOREIGN PATENT DOCUMENTS

| | | |
|---|---|---|
| EP | 0 158 430 | 10/1985 |
| EP | 0 380 456 | 8/1990 |

(Continued)

OTHER PUBLICATIONS

Altera Corporation, "Implementing Multipliers in FPGA Devices," *Application Note 306*, pp. 1-48, version 3.0, Jul. 2004.

(Continued)

*Primary Examiner* — Chuong D Ngo
(74) *Attorney, Agent, or Firm* — Ropes & Gray LLP; Jeffrey H. Ingerman

(57) ABSTRACT

A plurality of specialized processing blocks in a programmable logic device, including multipliers and circuitry for adding results of those multipliers, can be configured as a larger multiplier by adding to the specialized processing blocks selectable circuitry for shifting multiplier results before adding. In one embodiment, this allows all but the final addition to take place in specialized processing blocks, with the final addition occurring in programmable logic. In another embodiment, additional compression and adding circuitry allows even the final addition to occur in the specialized processing blocks. Circuitry that controls when an input is signed or unsigned facilitates complex arithmetic.

21 Claims, 9 Drawing Sheets

(56) References Cited

U.S. PATENT DOCUMENTS

| | | |
|---|---|---|
| 4,718,057 A | 1/1988 | Venkitakrishnan et al. |
| 4,727,508 A | 2/1988 | Williams |
| 4,736,335 A | 4/1988 | Barkan |
| 4,791,590 A | 12/1988 | Ku et al. |
| 4,799,004 A | 1/1989 | Mori |
| 4,823,295 A | 4/1989 | Mader |
| 4,839,847 A | 6/1989 | Laprade |
| 4,871,930 A | 10/1989 | Wong et al. |
| 4,912,345 A | 3/1990 | Steele et al. |
| 4,918,637 A | 4/1990 | Morton |
| 4,967,160 A | 10/1990 | Quievy et al. |
| 4,982,354 A | 1/1991 | Takeuchi et al. |
| 4,991,010 A | 2/1991 | Hailey et al. |
| 4,994,997 A | 2/1991 | Martin et al. |
| 5,073,863 A | 12/1991 | Zhang |
| 5,081,604 A | 1/1992 | Tanaka |
| 5,122,685 A | 6/1992 | Chan et al. |
| 5,128,559 A | 7/1992 | Steele |
| 5,175,702 A | 12/1992 | Beraud et al. |
| 5,208,491 A | 5/1993 | Ebeling et al. |
| RE34,363 E | 8/1993 | Freeman |
| 5,267,187 A | 11/1993 | Hsieh et al. |
| 5,296,759 A | 3/1994 | Sutherland et al. |
| 5,338,983 A | 8/1994 | Agarwala |
| 5,339,263 A | 8/1994 | White |
| 5,349,250 A | 9/1994 | New |
| 5,357,152 A | 10/1994 | Jennings, III et al. |
| 5,371,422 A | 12/1994 | Patel et al. |
| 5,375,079 A | 12/1994 | Uramoto et al. |
| 5,381,357 A | 1/1995 | Wedgwood et al. |
| 5,404,324 A | 4/1995 | Colon-Bonet |
| 5,424,589 A | 6/1995 | Dobbelaere et al. |
| 5,446,651 A | 8/1995 | Moyse et al. |
| 5,451,948 A | 9/1995 | Jekel |
| 5,452,231 A | 9/1995 | Butts et al. |
| 5,452,375 A | 9/1995 | Rousseau et al. |
| 5,457,644 A | 10/1995 | McCollum |
| 5,465,226 A | 11/1995 | Goto |
| 5,465,375 A | 11/1995 | Thepaut et al. |
| 5,483,178 A | 1/1996 | Costello et al. |
| 5,497,498 A | 3/1996 | Taylor |
| 5,500,812 A | 3/1996 | Saishi et al. |
| 5,500,828 A | 3/1996 | Doddington et al. |
| 5,523,963 A | 6/1996 | Hsieh et al. |
| 5,528,550 A | 6/1996 | Pawate et al. |
| 5,537,601 A | 7/1996 | Kimura et al. |
| 5,541,864 A | 7/1996 | Van Bavel et al. |
| 5,546,018 A | 8/1996 | New et al. |
| 5,550,993 A | 8/1996 | Ehlig et al. |
| 5,559,450 A | 9/1996 | Ngai et al. |
| 5,563,526 A | 10/1996 | Hastings et al. |
| 5,563,819 A | 10/1996 | Nelson |
| 5,570,039 A | 10/1996 | Oswald et al. |
| 5,570,040 A | 10/1996 | Lytle et al. |
| 5,572,148 A | 11/1996 | Lytle et al. |
| 5,581,501 A | 12/1996 | Sansbury et al. |
| 5,590,350 A | 12/1996 | Guttag et al. |
| 5,594,366 A | 1/1997 | Khong et al. |
| 5,594,912 A | 1/1997 | Brueckmann et al. |
| 5,596,763 A | 1/1997 | Guttag et al. |
| 5,606,266 A | 2/1997 | Pedersen |
| 5,617,058 A | 4/1997 | Adrian et al. |
| 5,631,848 A | 5/1997 | Laczko et al. |
| 5,633,601 A | 5/1997 | Nagaraj |
| 5,636,150 A | 6/1997 | Okamoto |
| 5,636,368 A | 6/1997 | Harrison et al. |
| 5,640,578 A | 6/1997 | Balmer et al. |
| 5,644,519 A | 7/1997 | Yatim et al. |
| 5,644,522 A | 7/1997 | Moyse et al. |
| 5,646,545 A | 7/1997 | Trimberger et al. |
| 5,646,875 A | 7/1997 | Taborn et al. |
| 5,648,732 A | 7/1997 | Duncan |
| 5,652,903 A | 7/1997 | Weng et al. |
| 5,655,069 A | 8/1997 | Ogawara et al. |
| 5,664,192 A | 9/1997 | Lloyd et al. |
| 5,689,195 A | 11/1997 | Cliff et al. |
| 5,696,708 A | 12/1997 | Leung |
| 5,729,495 A | 3/1998 | Madurawe |
| 5,740,404 A | 4/1998 | Baji |
| 5,744,980 A | 4/1998 | McGowan et al. |
| 5,744,991 A | 4/1998 | Jefferson et al. |
| 5,754,459 A | 5/1998 | Telikepalli |
| 5,761,483 A | 6/1998 | Trimberger |
| 5,764,555 A | 6/1998 | McPherson et al. |
| 5,768,613 A | 6/1998 | Asghar |
| 5,771,186 A | 6/1998 | Kodali et al. |
| 5,777,912 A | 7/1998 | Leung et al. |
| 5,784,636 A | 7/1998 | Rupp |
| 5,790,446 A | 8/1998 | Yu et al. |
| 5,794,067 A | 8/1998 | Kadowaki |
| 5,801,546 A | 9/1998 | Pierce et al. |
| 5,805,477 A | 9/1998 | Perner |
| 5,805,913 A | 9/1998 | Guttag et al. |
| 5,808,926 A | 9/1998 | Gorshtein et al. |
| 5,812,479 A | 9/1998 | Cliff et al. |
| 5,812,562 A | 9/1998 | Baeg |
| 5,815,422 A | 9/1998 | Dockser |
| 5,821,776 A | 10/1998 | McGowan |
| 5,825,202 A | 10/1998 | Tavana et al. |
| 5,835,393 A | 11/1998 | Melanson et al. |
| 5,838,165 A | 11/1998 | Chatter |
| 5,841,684 A | 11/1998 | Dockser |
| 5,847,579 A | 12/1998 | Trimberger |
| 5,847,978 A | 12/1998 | Ogura et al. |
| 5,859,878 A | 1/1999 | Phillips et al. |
| 5,869,979 A | 2/1999 | Bocchino |
| 5,872,380 A | 2/1999 | Rostoker et al. |
| 5,874,834 A | 2/1999 | New |
| 5,878,250 A | 3/1999 | LeBlanc |
| 5,880,981 A | 3/1999 | Kojima et al. |
| 5,892,962 A | 4/1999 | Cloutier |
| 5,894,228 A | 4/1999 | Reddy et al. |
| 5,898,602 A | 4/1999 | Rothman et al. |
| 5,931,898 A | 8/1999 | Khoury |
| 5,942,914 A | 8/1999 | Reddy et al. |
| 5,944,774 A | 8/1999 | Dent |
| 5,949,710 A | 9/1999 | Pass et al. |
| 5,951,673 A | 9/1999 | Miyata |
| 5,956,265 A | 9/1999 | Lewis |
| 5,959,871 A | 9/1999 | Pierzchala et al. |
| 5,960,193 A | 9/1999 | Guttag et al. |
| 5,961,635 A | 10/1999 | Guttag et al. |
| 5,963,048 A | 10/1999 | Harrison et al. |
| 5,963,050 A | 10/1999 | Young et al. |
| 5,968,196 A | 10/1999 | Ramamurthy et al. |
| 5,970,254 A | 10/1999 | Cooke et al. |
| 5,978,260 A | 11/1999 | Trimberger et al. |
| 5,982,195 A | 11/1999 | Cliff et al. |
| 5,986,465 A | 11/1999 | Mendel |
| 5,991,788 A | 11/1999 | Mintzer |
| 5,991,898 A | 11/1999 | Rajski et al. |
| 5,995,748 A | 11/1999 | Guttag et al. |
| 5,999,015 A | 12/1999 | Cliff et al. |
| 5,999,990 A | 12/1999 | Sharrit et al. |
| 6,005,806 A | 12/1999 | Madurawe et al. |
| 6,006,321 A | 12/1999 | Abbott |
| 6,009,451 A | 12/1999 | Burns |
| 6,020,759 A | 2/2000 | Heile |
| 6,021,423 A | 2/2000 | Nag et al. |
| 6,029,187 A | 2/2000 | Verbauwhede |
| 6,031,763 A | 2/2000 | Sansbury |
| 6,041,339 A | 3/2000 | Yu et al. |
| 6,041,340 A | 3/2000 | Mintzer |
| 6,052,327 A | 4/2000 | Reddy et al. |
| 6,052,755 A | 4/2000 | Terrill et al. |
| 6,064,614 A | 5/2000 | Khoury |
| 6,065,131 A | 5/2000 | Andrews et al. |
| 6,066,960 A | 5/2000 | Pedersen |
| 6,069,487 A | 5/2000 | Lane et al. |
| 6,072,994 A | 6/2000 | Phillips et al. |
| 6,073,154 A | 6/2000 | Dick |
| 6,075,381 A | 6/2000 | LaBerge |
| 6,084,429 A | 7/2000 | Trimberger |
| 6,085,317 A | 7/2000 | Smith |

(56) References Cited

U.S. PATENT DOCUMENTS

| | | | |
|---|---|---|---|
| 6,091,261 A | 7/2000 | DeLange | |
| 6,091,765 A | 7/2000 | Pietzold, III et al. | |
| 6,094,726 A | 7/2000 | Gonion et al. | |
| 6,097,988 A | 8/2000 | Tobias | |
| 6,098,163 A | 8/2000 | Guttag et al. | |
| 6,107,820 A | 8/2000 | Jefferson et al. | |
| 6,107,821 A | 8/2000 | Kelem et al. | |
| 6,107,824 A | 8/2000 | Reddy et al. | |
| 6,130,554 A | 10/2000 | Kolze et al. | |
| 6,140,839 A | 10/2000 | Kaviani et al. | |
| 6,144,980 A | 11/2000 | Oberman | |
| 6,154,049 A | 11/2000 | New | |
| 6,157,210 A | 12/2000 | Zaveri et al. | |
| 6,163,788 A | 12/2000 | Chen et al. | |
| 6,167,415 A | 12/2000 | Fischer et al. | |
| 6,175,849 B1 | 1/2001 | Smith | |
| 6,215,326 B1 | 4/2001 | Jefferson et al. | |
| 6,226,735 B1 | 5/2001 | Mirsky | |
| 6,242,947 B1 | 6/2001 | Trimberger | |
| 6,243,729 B1 | 6/2001 | Staszewski | |
| 6,246,258 B1 | 6/2001 | Lesea | |
| 6,260,053 B1 | 7/2001 | Maulik et al. | |
| 6,279,021 B1 | 8/2001 | Takano et al. | |
| 6,286,024 B1 | 9/2001 | Yano et al. | |
| 6,314,442 B1 | 11/2001 | Suzuki | |
| 6,314,551 B1 | 11/2001 | Borland | |
| 6,321,246 B1 | 11/2001 | Page et al. | |
| 6,323,680 B1 | 11/2001 | Pedersen et al. | |
| 6,327,605 B2 | 12/2001 | Arakawa et al. | |
| 6,351,142 B1 | 2/2002 | Abbott | |
| 6,353,843 B1 | 3/2002 | Chehrazi et al. | |
| 6,359,468 B1 | 3/2002 | Park et al. | |
| 6,360,240 B1 | 3/2002 | Takano et al. | |
| 6,362,650 B1 | 3/2002 | New et al. | |
| 6,366,944 B1 | 4/2002 | Hossain et al. | |
| 6,367,003 B1 | 4/2002 | Davis | |
| 6,369,610 B1 | 4/2002 | Cheung et al. | |
| 6,377,970 B1 | 4/2002 | Abdallah et al. | |
| 6,407,576 B1 | 6/2002 | Ngai et al. | |
| 6,407,694 B1 | 6/2002 | Cox et al. | |
| 6,427,157 B1 | 7/2002 | Webb | |
| 6,434,587 B1 | 8/2002 | Liao et al. | |
| 6,438,569 B1 | 8/2002 | Abbott | |
| 6,438,570 B1 | 8/2002 | Miller | |
| 6,446,107 B1 | 9/2002 | Knowles | |
| 6,453,382 B1 | 9/2002 | Heile | |
| 6,467,017 B1 | 10/2002 | Ngai et al. | |
| 6,480,980 B2 | 11/2002 | Koe | |
| 6,483,343 B1 | 11/2002 | Faith et al. | |
| 6,487,575 B1 | 11/2002 | Oberman | |
| 6,523,055 B1 | 2/2003 | Yu et al. | |
| 6,523,057 B1 | 2/2003 | Savo et al. | |
| 6,531,888 B2 | 3/2003 | Abbott | |
| 6,538,470 B1 | 3/2003 | Langhammer et al. | |
| 6,542,000 B1 | 4/2003 | Black et al. | |
| 6,556,044 B2 | 4/2003 | Langhammer et al. | |
| 6,557,092 B1 | 4/2003 | Callen | |
| 6,571,268 B1 | 5/2003 | Giacalone et al. | |
| 6,573,749 B2 | 6/2003 | New et al. | |
| 6,574,762 B1 | 6/2003 | Karimi et al. | |
| 6,591,283 B1 | 7/2003 | Conway et al. | |
| 6,591,357 B2 | 7/2003 | Mirsky | |
| 6,600,495 B1 | 7/2003 | Boland et al. | |
| 6,600,788 B1 | 7/2003 | Dick et al. | |
| 6,628,140 B2 | 9/2003 | Langhammer et al. | |
| 6,687,722 B1 | 2/2004 | Larsson et al. | |
| 6,692,534 B1 | 2/2004 | Wang et al. | |
| 6,700,581 B2 | 3/2004 | Baldwin et al. | |
| 6,725,441 B1 | 4/2004 | Keller et al. | |
| 6,728,901 B1 | 4/2004 | Rajski et al. | |
| 6,731,133 B1 | 5/2004 | Feng et al. | |
| 6,732,134 B1 | 5/2004 | Rosenberg | |
| 6,744,278 B1 | 6/2004 | Liu et al. | |
| 6,745,254 B2 | 6/2004 | Boggs et al. | |
| 6,763,367 B2 | 7/2004 | Kwon et al. | |
| 6,771,094 B1 | 8/2004 | Langhammer et al. | |
| 6,774,669 B1 | 8/2004 | Liu et al. | |
| 6,781,408 B1 | 8/2004 | Langhammer | |
| 6,781,410 B2 | 8/2004 | Pani et al. | |
| 6,788,104 B2 | 9/2004 | Singh et al. | |
| 6,801,924 B1 | 10/2004 | Green et al. | |
| 6,801,925 B2 | 10/2004 | Pether et al. | |
| 6,836,839 B2 | 12/2004 | Master et al. | |
| 6,874,079 B2 | 3/2005 | Hogenauer | |
| 6,889,238 B2 | 5/2005 | Johnson | |
| 6,904,471 B2 | 6/2005 | Boggs et al. | |
| 6,924,663 B2 | 8/2005 | Masui et al. | |
| 6,963,890 B2 | 11/2005 | Dutta et al. | |
| 6,971,083 B1 | 11/2005 | Farrugia et al. | |
| 6,978,287 B1 | 12/2005 | Langhammer | |
| 6,983,300 B2 | 1/2006 | Ferroussat | |
| 7,020,673 B2 | 3/2006 | Ozawa | |
| 7,047,272 B2 | 5/2006 | Giacalone et al. | |
| 7,062,526 B1 | 6/2006 | Hoyle | |
| 7,093,204 B2 | 8/2006 | Oktem et al. | |
| 7,107,305 B2 | 9/2006 | Deng et al. | |
| 7,113,969 B1 | 9/2006 | Green et al. | |
| 7,181,484 B2 | 2/2007 | Stribaek et al. | |
| 7,230,451 B1 | 6/2007 | Langhammer | |
| 7,287,051 B1 | 10/2007 | Langhammer | |
| 7,313,585 B2 | 12/2007 | Winterrowd | |
| 7,346,644 B1 * | 3/2008 | Langhammer et al. | 708/625 |
| 7,395,298 B2 | 7/2008 | Debes et al. | |
| 7,401,109 B2 | 7/2008 | Koc et al. | |
| 7,409,417 B2 | 8/2008 | Lou | |
| 7,415,542 B2 | 8/2008 | Hennedy et al. | |
| 7,421,465 B1 | 9/2008 | Rarick et al. | |
| 7,428,565 B2 | 9/2008 | Fujimori | |
| 7,428,566 B2 | 9/2008 | Siu et al. | |
| 7,430,578 B2 | 9/2008 | Debes et al. | |
| 7,430,656 B2 | 9/2008 | Sperber et al. | |
| 7,447,310 B2 | 11/2008 | Koc et al. | |
| 7,472,155 B2 | 12/2008 | Simkins et al. | |
| 7,508,936 B2 | 3/2009 | Eberle et al. | |
| 7,536,430 B2 | 5/2009 | Guevokian et al. | |
| 7,567,997 B2 | 7/2009 | Simkins et al. | |
| 7,590,676 B1 | 9/2009 | Langhammer | |
| 7,646,430 B2 | 1/2010 | Brown Elliott et al. | |
| 7,668,896 B2 | 2/2010 | Lutz et al. | |
| 7,698,358 B1 * | 4/2010 | Langhammer et al. | 708/523 |
| 7,719,446 B2 | 5/2010 | Rosenthal et al. | |
| 7,769,797 B2 | 8/2010 | Cho et al. | |
| 7,814,137 B1 | 10/2010 | Mauer | |
| 7,822,799 B1 | 10/2010 | Langhammer et al. | |
| 7,836,117 B1 | 11/2010 | Langhammer et al. | |
| 7,865,541 B1 | 1/2011 | Langhammer | |
| 7,930,335 B2 | 4/2011 | Gura | |
| 7,930,336 B2 | 4/2011 | Langhammer | |
| 7,930,337 B2 | 4/2011 | Hasenplaugh et al. | |
| 8,041,759 B1 | 10/2011 | Langhammer et al. | |
| 8,090,758 B1 | 1/2012 | Shimanek et al. | |
| 8,301,681 B1 | 10/2012 | Lee et al. | |
| 2001/0023425 A1 | 9/2001 | Oberman et al. | |
| 2001/0029515 A1 | 10/2001 | Mirsky | |
| 2001/0037352 A1 | 11/2001 | Hong | |
| 2002/0002573 A1 | 1/2002 | Landers et al. | |
| 2002/0038324 A1 | 3/2002 | Page et al. | |
| 2002/0049798 A1 | 4/2002 | Wang et al. | |
| 2002/0078114 A1 | 6/2002 | Wang et al. | |
| 2002/0089348 A1 | 7/2002 | Langhammer | |
| 2002/0116434 A1 | 8/2002 | Nancekievill | |
| 2003/0088757 A1 | 5/2003 | Lindner et al. | |
| 2004/0064770 A1 | 4/2004 | Xin | |
| 2004/0083412 A1 | 4/2004 | Corbin et al. | |
| 2004/0103133 A1 | 5/2004 | Gurney | |
| 2004/0122882 A1 | 6/2004 | Zakharov et al. | |
| 2004/0148321 A1 | 7/2004 | Guevorkian et al. | |
| 2004/0172439 A1 | 9/2004 | Lin | |
| 2004/0178818 A1 | 9/2004 | Crotty et al. | |
| 2004/0193981 A1 | 9/2004 | Clark et al. | |
| 2004/0267857 A1 | 12/2004 | Abel et al. | |
| 2004/0267863 A1 | 12/2004 | Bhushan et al. | |
| 2005/0038842 A1 | 2/2005 | Stoye | |
| 2005/0144212 A1 | 6/2005 | Simkins et al. | |

(56) References Cited

U.S. PATENT DOCUMENTS

| | | | |
|---|---|---|---|
| 2005/0144215 | A1 | 6/2005 | Simkins et al. |
| 2005/0144216 | A1 | 6/2005 | Simkins et al. |
| 2005/0166038 | A1 | 7/2005 | Wang et al. |
| 2005/0187999 | A1 | 8/2005 | Zheng et al. |
| 2005/0262175 | A1 | 11/2005 | Iino et al. |
| 2006/0020655 | A1 | 1/2006 | Lin |
| 2006/0230095 | A1 | 10/2006 | Simkins et al. |
| 2007/0083585 | A1 | 4/2007 | St Denis et al. |
| 2007/0185951 | A1 | 8/2007 | Lee et al. |
| 2007/0185952 | A1 | 8/2007 | Langhammer et al. |
| 2007/0241773 | A1 | 10/2007 | Hutchings et al. |
| 2008/0133627 | A1 | 6/2008 | Langhammer et al. |
| 2008/0183783 | A1 | 7/2008 | Tubbs |
| 2009/0172052 | A1 | 7/2009 | DeLaquil et al. |
| 2009/0187615 | A1 | 7/2009 | Abe et al. |
| 2009/0300088 | A1 | 12/2009 | Michaels et al. |
| 2010/0098189 | A1 | 4/2010 | Oketani |
| 2010/0191786 | A1 | 7/2010 | Simkins et al. |
| 2010/0228806 | A1 | 9/2010 | Streicher et al. |

FOREIGN PATENT DOCUMENTS

| | | |
|---|---|---|
| EP | 0 411 491 | 2/1991 |
| EP | 0 461 798 | 12/1991 |
| EP | 0 498 066 | 8/1992 |
| EP | 0 555 092 | 8/1993 |
| EP | 0 606 653 | 7/1994 |
| EP | 0 657 803 | 6/1995 |
| EP | 0 660 227 | 6/1995 |
| EP | 0 668 659 | 8/1995 |
| EP | 0 721 159 | 7/1996 |
| EP | 0 905 906 | 3/1999 |
| EP | 0 909 028 | 4/1999 |
| EP | 0 927 393 | 7/1999 |
| EP | 0 992 885 | 4/2000 |
| EP | 1 031 934 | 8/2000 |
| EP | 1 058 185 | 12/2000 |
| EP | 1 220 108 | 7/2002 |
| GB | 2 283 602 | 5/1995 |
| GB | 2 286 737 | 8/1995 |
| GB | 2 318 198 | 4/1998 |
| JP | 61-237133 | 10/1986 |
| JP | 63-216131 | 8/1988 |
| JP | 4-332036 | 11/1992 |
| JP | 5-134851 | 6/1993 |
| JP | 6-187129 | 7/1994 |
| JP | 7-135447 | 5/1995 |
| JP | 11-219279 | 8/1999 |
| JP | 11-296345 | 10/1999 |
| JP | 2000-259394 | 9/2000 |
| JP | 2000-353077 | 12/2000 |
| JP | 2002-108606 | 4/2002 |
| JP | 2002-251281 | 9/2002 |
| WO | WO95/27243 | 10/1995 |
| WO | WO96/28774 | 9/1996 |
| WO | WO97/08606 | 3/1997 |
| WO | WO 97/08610 | 3/1997 |
| WO | WO98/12629 | 3/1998 |
| WO | WO98/32071 | 7/1998 |
| WO | WO98/38741 | 9/1998 |
| WO | WO99/22292 | 5/1999 |
| WO | WO99/31574 | 6/1999 |
| WO | WO99/56394 | 11/1999 |
| WO | WO00/51239 | 8/2000 |
| WO | WO00/52824 | 9/2000 |
| WO | WO01/13562 | 2/2001 |
| WO | WO 2005/066832 | 7/2005 |
| WO | WO2005/101190 | 10/2005 |

OTHER PUBLICATIONS

Altera Corporation, "Advanced Synthesis Cookbook: A Design Guide for Stratix II, Stratix III and Stratix IV Devices," Document Version 3.0, 112 pgs., May 2008.

Altera Corporation, "FIR Compiler: MegaCore® Function User Guide," version 3.3.0, rev. 1, pp. 3-11 through 3-15 (Oct. 2005).

Altera Corporation, "Stratix II Device Handbook, Chapter 6—DSP Blocks in Stratix II Devices," v1.1, Jul. 2004.

Altera Corporation, "Digital Signal Processing (DSP)," *Stratix Device Handbook*, vol. 2, Chapter 6 and Chapter 7, v1.1 (Sep. 2004).

Altera Corporation, "DSP Blocks in Stratix II and Stratix II GX Devices," *Stratix II Device Handbook*, vol. 2, Chapter 6, v4.0 (Oct. 2005).

Amos, D., "PLD architectures match DSP algorithms," *Electronic Product Design*, vol. 17, No. 7, Jul. 1996, pp. 30, 32.

Analog Devices, Inc., The Applications Engineering Staff of Analog Devices, DSP Division, *Digital Signal Processing Applications Using the ADSP-2100 Family* (edited by Amy Mar), 1990, pp. 141-192).

Andrejas, J., et al., "Reusable DSP functions in FPGAs," *Field-Programmable Logic and Applications. Roadmap to Reconfigurable Computing. 10th International Conference, FPL 2000. Proceedings* (*Lecture Notes in Computer Science* vol. 1896), Aug. 27-30, 2000, pp. 456-61.

Aoki, T., "Signed-weight arithmetic and its application to a field-programmable digital filter architecture," *IEICE Transactions on Electronics*, 1999, vol. E82C, No. 9, Sep. 1999, pp. 1687-1698.

Ashour, M.A., et al., "An FPGA implementation guide for some different types of serial-parallel multiplier-structures," *Microelectronics Journal*, vol. 31, No. 3, 2000, pp. 161-68.

Berg. B.L., et al."Designing Power and Area Efficient Multistage FIR Decimators with Economical Low Order Filters," *ChipCenter Technical Note*, Dec. 2001.

Bursky, D., "Programmable Logic Challenges Traditional ASIC SoC Designs", *Electronic Design*, Apr. 15, 2002.

Chhabra, A. et al., Texas Instruments Inc., "A Block Floating Point Implementation on the TMS320C54x DSP", Application Report SPRA610, Dec. 1999, pp. 1-10.

Colet, P., "When DSPs and FPGAs meet: Optimizing image processing architectures," *Advanced Imaging*, vol. 12, No. 9, Sep. 1997, pp. 14, 16, 18.

Crookes, D., et al., "Design and implementation of a high level programming environment for FPGA-based image processing," *IEE Proceedings-Vision, Image and Signal Processing*, vol. 147, No. 4, Aug. 2000, pp. 377-384.

Debowski, L., et al., "A new flexible architecture of digital control systems based on DSP and complex CPLD technology for power conversion applications," *PCIM 2000: Europe Official Proceedings of the Thirty-Seventh International Intelligent Motion Conference*, Jun. 6-8, 2000, pp. 281-286.

deDinechin, F. et al., "Large multipliers with less DSP blocks," retrieved from http:—hal-ens-lyon.archives-ouvertes.fr-ensl-00356421-en-, 9 pgs., available online Jan. 2009.

Dick, C., et al., "Configurable logic for digital communications: some signal processing perspectives," *IEEE Communications Magazine*, vol. 37, No. 8, Aug. 1999, pp. 107-111.

Do, T.-T., et al., "A flexible implementation of high-performance FIR filters on Xilinx FPGAs," *Field-Programmable Logic and Applications: From FPGAs to Computing Paradigm. 8th International Workshop, FPL'98. Proceedings*, Hartenstein, R.W., et al., eds., Aug. 31-Sep. 3, 1998, pp. 441-445.

Faura et al., "A Novel Mixed Signal Programmable Device With On-Chip Microprocessor," Custom Integrated Circuits Conference, 1997. Proceedings of the IEEE 1997 Santa Clara, CA, USA, May 5, 1997, pp. 103-106.

Gaffer, A.A., et al., "Floating-Point Bitwidth Analysis via Automatic Differentiation," *IEEE Conference on Field Programmable Technology*, Hong Kong, Dec. 2002.

Govindu, G. et al., "A Library of Parameterizable Floating-Point Cores for FPGAs and Their Application to Scientific Computing," *Proc Int'l Conf. Eng. Reconfigurable Systems and Algorithms* (*ERSA'05*) Jun. 2005.

Govindu, G. et al., "Analysis of High-performance Floating-point Arithmetic on FPGAs," *Proceedings of the 18$^{th}$ International Parallel and Distributed Processing Symposium* (*PDPS'04*), pp. 149-156, Apr. 2004.

(56) References Cited

OTHER PUBLICATIONS

Guccione, S.A.,"Run-time Reconfiguration at Xilinx," *Parallel and distributed processing: 15 IPDPS 2000 workshops*, Rolim, J., ed., May 1-5, 2000, p. 873.
Hauck, S., "The Future of Reconfigurable Systems," *Keynote Address, 5th Canadian Conference on Field Programmable Devices*, Jun. 1998, http:—www.ee.washington.edu-people-faculty-hauck-publications-ReconfigFuture.PDF.
Haynes, S.D., et al., "Configurable multiplier blocks for embedding in FPGAs," *Electronics Letters*, vol. 34, No. 7, pp. 638-639 (Apr. 2, 1998).
Heysters, P.M., et al., "Mapping of DSP algorithms on field programmable function arrays," *Field-Programmable Logic and Application. Roadmap to Reconfigurable Computing. 10th International Conference, FPL 2000, Proceedings (Lecture Notes in Computer Science* vol. 1896), Aug. 27-30, 2000, pp. 400-411.
Huang, J., et al., "Simulated Performance of 1000BASE-T Receiver with Different Analog Front End Designs," *Proceedings of the 35th Asilomar Conference on Signals, Systems, and Computers*, Nov. 4-7, 2001.
"Implementing Multipliers in FLEX 10K EABs", *Altera*, Mar. 1996.
"Implementing Logic with the Embedded Array in FLEX 10K Devices", *Altera*, May 2001, ver. 2.1.
Jinghua Li, "Design a pocket multi-bit multiplier in FPGA " *1996 2nd International Conference on ASIC Proceedings* (IEEE Cat. No. 96TH8140) Oct. 21-24, 1996, pp. 275-279.
Jones, G., "Field-programmable digital signal conditioning," *Electronic Product Design*, vol. 21, No. 6, Jun. 2000, pp. C36-C38.
Kim, Y., et al., "Fast GPU Implementation for the Solution of Tridiagonal Matrix Systems," *Journal of Korean Institute of Information Scientists and Engineers*, vol. 32, No. 12, pp. 692-704, Dec. 2005.
Kiefer, R., et al., "Performance comparison of software-FPGA hardware partitions for a DSP application," *14th Australian Microelectronics Conference. Microelectronics: Technology Today for the Future. MICRO '97 Proceedings*, Sep. 28-Oct. 1, 1997, pp. 88-93.
Kramberger, I., "DSP acceleration using a reconfigurable FPGA " *ISIE '99. Proceedings of the IEEE International Symposium on Industrial Electronics* (Cat. No. 99TH8465) vol. 3, Jul. 12-16, 1999, pp. 1522-1525.
Langhammer, M., "How to implement DSP in programmable logic " *Elettronica Oggi*, No. 266, Dec. 1998, pp. 113-115.
Langhammer, M., "Implementing a DSP in Programmable Logic," *Online EE Times*, May 1998, http:—www.eetimes.com-editorial-1998-coverstory9805.html.
Lattice Semiconductor Corp, *ORCA® FPGA Express™ Interface Manual: ispLEVER® Version 3.0*, 2002.
Lazaravich, B.V., "Function block oriented field programmable logic arrays," *Motorola, Inc. Technical Developments*, vol. 18, Mar. 1993, pp. 10-11.
Lucent Technologies, Microelectronics Group,"Implementing and Optimizing Multipliers in ORCA™ FPGAs,", Application Note. AP97-008FGPA, Feb. 1997.
Lund, D., et al., "A new development system for reconfigurable digital signal processing," *First International Conference on 3G Mobile Communication Technologies* (Conf. Publ. No. 471), Mar. 27-29, 2000, pp. 306-310.
Miller, N.L., et al., "Reconfigurable integrated circuit for high performance computer arithmetic," *Proceedings of the 1998 IEE Colloquium on Evolvable Hardware Systems (Digest)*, No. 233, 1998, pp. 2-1-2-4.
Mintzer, L., "Xilinx FPGA as an FFT processor," *Electronic Engineering*, vol. 69, No. 845, May 1997, pp. 81, 82, 84.
Nakasato, N., et al., "Acceleration of Hydrosynamical Simulations using a FPGA board" *The Institute of Electronics Information and Communication Technical Report CPSY2005-47*, vol. 105, No. 515, Jan. 17, 2006.
Nedjah, N., et al., "Fast Less Recursive Hardware for Large Number Multiplication Using Karatsuba-Ofman's Algorithm," *Computer and Information Sciences—ISCIS*, pp. 43-50, 2003.

Nozal, L., et al., "A new vision system: programmable logic devices and digital signal processor architecture (PLD+DSP)," *Proceedings IECON '91. 1991 International Conference on Industrial Electronics, Control and Instrumentation* (Cat. No. 91CH2976-9), vol. 3, Oct. 28-Nov. 1, 1991, pp. 2014-2018.
Osana, Y., et al., "Hardware-resource Utilization Analysis on an FPGA-Based Biochemical Simulator ReCSiP", *The Institute of Electronics Information and Communication Technical Report CPSY2005-63*, vol. 105, No. 516, Jan. 18, 2006.
Papenfuss, J.R, et al., "Implementation of a real-time, frequency selective, RF channel simulator using a hybrid DSP-FPGA architecture," *RAWCON 2000: 2000 IEEE Radio and Wireless Conference* (Cat. No. 00EX404), Sep. 10-13, 2000, pp. 135-138.
Parhami, B., "Configurable arithmetic arrays with data-driven control," *34th Asilomar Conference on Signals, Systems and Computers*, vol. 1, 2000, pp. 89-93.
"The QuickDSP Design Guide", Quicklogic, Aug. 2001, revision B.
"QuickDSP™ Family Data Sheet", *Quicklogic*, Aug. 7, 2001, revision B.
Rangasayee, K., "Complex PLDs let you produce efficient arithmetic designs," *EDN (European Edition)*, vol. 41, No. 13, Jun. 20, 1996, pp. 109, 110, 112, 114, 116.
Rosado, a., et al., "A high-speed multiplier coprocessor unit based on FPGA," *Journal of Electrical Engineering*, vol. 48, No. 11-12, 1997, pp. 298-302.
Santillan-Q., G.F., et al., "Real-time integer convolution implemented using systolic arrays and a digit-serial architecture in complex programmable logic devices," *Proceedings of the Third International Workshop on Design of Mixed-Mode Integrated Circuits and Applications* (Cat. No. 99EX303), Jul. 26-28,1999, pp. 147-150.
Texas Instruments Inc., "TMS320C54x DSP Reference Set, vol. 1: CPU and Peripherals", Literature No. SPRU131F, Apr. 1999, pp. 2-1 through 2-16 and 4-1 through 4-29.
Tisserand, A., et al., "An on-line arithmetic based FPGA for low power custom computing," *Field Programmable Logic and Applications, 9th International Workshop, FPL'99, Proceedings (Lecture Notes in Computer Science* vol. 1673), Lysaght, P., et al., eds., Aug. 30-Sep. 1, 1999, pp. 264-273.
Tralka, C., "Symbiosis of DSP and PLD," *Elektronik*, vol. 49, No. 14 , Jul. 11, 2000, pp. 84-96.
Underwood, K. "FPGAs vs. CPUs: Trends in Peak Floating-Point Performance," *Proceedings of the 2004 ACM-SIGDA 12th International Symposium on Field Programmable Gate Arrays*, pp. 171-180, Feb. 22-24, 2004.
Valls, J., et al., "A Study About FPGA-Based Digital Filters," *Signal Processing Systems, 1998*, SIPS 98, 1998 IEEE Workshop, Oct. 10, 1998, pp. 192-201.
"Virtex-II 1.5V Field-Programmable Gate Arrays", *Xilinx*, Jan. 25, 2001, module 2 of 4.
"Virtex-II 1.5V Field-Programmable Gate Arrays", *Xilinx*, Apr. 2, 2001, module 1 of 4.
"Virtex-II 1.5V Field-Programmable Gate Arrays", *Xilinx*, Apr. 2, 2001, module 2 of 4.
Vladimirova, T. et al., "Floating-Point Mathematical Co-Processor for a Single-Chip On-Board Computer," *MAPLD'03 Conference*, D5, Sep. 2003.
Wajih, E.-H.Y. et al., "Efficient Hardware Architecture of Recursive Karatsuba-Ofman Multiplier," *3rd International Conference on Design and Technology of Integrated Systems in Nanoscale Era*, 6 pgs., Mar. 2008.
Walters, A.L., "A Scaleable FIR Filter Implementation Using 32-bit Floating-Point Complex Arithmetic on,a FPGA Based Custom Computing Platform," Allison L. Walters, Thesis Submitted to the Faculty of Virginia Polytechnic Institute and State University, Jan. 30, 1998.
Weisstein, E.W., "Karatsuba Multiplication," *MathWorld—A Wolfram Web Resource* (Dec. 9, 2007), accessed Dec. 11, 2007 at http:—mathworld.wolfram.com-KaratsubaMultiplication.html.
Wenzel, L., "Field programmable gate arrays (FPGAs) to replace digital signal processor integrated circuits," *Elektronik* vol. 49, No. 5, Mar. 7, 2000, pp. 78-86.
"Xilinx Unveils New FPGA Architecture to Enable High-Performance, 10 Million System Gate Designs", *Xilinx*, Jun. 22, 2000.

(56) References Cited

OTHER PUBLICATIONS

"Xilinx Announces DSP Algorithms, Tools and Features for Virtex-II Architecture", *Xilinx*, Nov. 21, 2000.

Xilinx Inc., "Virtex-II 1.5V Field-Programmable Gate Arrays", Advance Product Specification, DS031-2 (v1.9), Nov. 29, 2001, Module 2 of 4, pp. 1-39.

Xilinx Inc., "Using Embedded Multipliers", Virtex-II Platform FPGA Handbook, UG002 (v1.3), Dec. 3, 2001, pp. 251-257.

Xilinx, Inc., "A 1D Systolic FIR," copyright 1994-2002, downloaded from http:—www.iro.umontreal.ca-~aboulham-F6221-Xilinx%20A%201D%20systolic%20FIR.htm.

Xilinx, Inc., "The Future of FPGA's," White Paper, available Nov. 14, 2005 for download from http:—www.xilinx.com-prs_rls,5yrwhite.htm.

Xilinx Inc., "XtremeDSP Design Considerations User Guide," v 1.2, Feb. 4, 2005.

Xilinx Inc., "Complex Multiplier v2.0", DS291 Product Specification-Datasheet, Nov. 2004.

Zhou, G. et al., "Efficient and High-Throughput Implementations of AES-GCM on International Conference on FPGAs," *International Conference on Field-Programmable Technology*, 8 pgs., Dec. 2007.

\* cited by examiner

LARGE MULTIPLIER FOR PROGRAMMABLE LOGIC DEVICE

CROSS REFERENCE TO RELATED APPLICATION

This is a division of commonly-assigned U.S. patent application Ser. No. 11/682,787, filed Mar. 6, 2007, now U.S. Pat. No. 8,386,553, which is a continuation-in-part of commonly-assigned U.S. patent application Ser. No. 11/566,982, filed Dec. 5, 2006 and copending therewith, each of which is hereby incorporated by reference herein in its respective entirety.

BACKGROUND OF THE INVENTION

This invention relates to programmable logic devices (PLDs), and, more particularly, to the use of specialized processing blocks which may be included in such devices to perform large multiplications.

As applications for which PLDs are used increase in complexity, it has become more common to design PLDs to include specialized processing blocks in addition to blocks of generic programmable logic resources. Such specialized processing blocks may include a concentration of circuitry on a PLD that has been partly or fully hardwired to perform one or more specific tasks, such as a logical or a mathematical operation. A specialized processing block may also contain one or more specialized structures, such as an array of configurable memory elements. Examples of structures that are commonly implemented in such specialized processing blocks include: multipliers, arithmetic logic units (ALUs), barrel-shifters, various memory elements (such as FIFO/LIFO/SIPO/RAM/ROM/CAM blocks and register files), AND/NAND/OR/NOR arrays, etc., or combinations thereof.

One particularly useful type of specialized processing block that has been provided on PLDs is a digital signal processing (DSP) block, which may be used to process, e.g., audio signals. Such blocks are frequently also referred to as multiply-accumulate ("MAC") blocks, because they include structures to perform multiplication operations, and sums and/or accumulations of multiplication operations.

For example, a PLD sold by Altera Corporation, of San Jose, Calif., under the name STRATIX® II includes DSP blocks, each of which includes four 18-by-18 multipliers. Each of those DSP blocks also includes adders and registers, as well as programmable connectors (e.g., multiplexers) that allow the various components to be configured in different ways. In each such block, the multipliers can be configured not only as four individual 18-by-18 multipliers, but also as four smaller multipliers, or as one larger (36-by-36) multiplier. In addition, one 18-by-18 complex multiplication (which decomposes into two 18-by-18 multiplication operations for each of the real and imaginary parts) can be performed.

Although such a DSP block may be configured as a multiplier as large as 36-by-36, a user may want to create a larger multiplier. For example, while a 36-by-36 multiplier will support 25-by-25 single-precision multiplication under the IEEE 754-1985 standard, it is too small for double-precision multiplication, or for 36-by-36 complex multiplication. While the multipliers from several DSP blocks can be used together to implement double-precision multiplication, or larger complex multiplication, the logic needed to interconnect the multipliers has heretofore been programmed by the user in the general-purpose programmable logic outside the DSP block, making it slow and less efficient, and consuming general-purpose resources that might be put to other uses.

SUMMARY OF THE INVENTION

The present invention relates to specialized processing blocks for PLDs that are provided with logic within the blocks to facilitate the performance of multiplications larger than that which can be performed within any single specialized processing block, reducing or eliminating reliance on general-purpose programmable resources of the PLD.

In accordance with the invention, control is provided over whether one or more multiplicand inputs are forced to be unsigned or are allowed to be signed. This enables the performance of more of the calculations involved in signed or complex multiplications. The ability to shift results—either within or outside the block—before further processing, further increases the number of types of calculations that can be performed.

In accordance with the present invention, there is provided, for use in a programmable logic device having a plurality of specialized processing blocks, each of those specialized processing blocks having at least four n-by-n multipliers arranged in four-multiplier units, a method of performing a signed 3n-by-3n multiplication operation. The method includes performing a 2n-by-2n multiplication using four of the n-by-n multipliers in a first of the four-multiplier units, performing an n-by-n multiplication using one of the n-by-n multipliers in a second of the four-multiplier units, and performing first and second 2n-by-n multiplications in a third of the four-multiplier units, using two of the n-by-n multipliers for each of the 2n-by-n multiplications. In each of the multiplications, multiplicands representing n most significant bits are treated as signed operands and multiplicands representing n least significant bits are forced to be unsigned. The method further includes shifting a second partial product of each of the 2n-by-n multiplications to align it with a first partial product of each of the 2n-by-n multiplications for addition within the third four-multiplier unit, and adding results of the multiplications from the first, second and third four-multiplier units.

A programmable logic device configured to perform the method, and software to configure the programmable logic device, are also provided.

In addition, there is provided a method of performing a complex 2n-by-n multiplication operation in such a programmable logic device. The method includes
(a) computing an imaginary part of the complex multiplication in a first of the four-multiplier units by (1) breaking each of real and imaginary parts of a 2n-bit multiplicand into respective upper and lower n-bit portions, (2) performing first respective n-by-n multiplications of upper and lower n-bit portions of the real part of the 2n-bit multiplicand by an imaginary part of the n-bit multiplicand using a first two of the four multipliers of the first four-multiplier unit, shifting a result of the first respective multiplication involving the upper portion relative to a result of the first respective multiplication involving the lower portion, and adding the first respective multiplications to form a first partial product, (2) performing second respective n-by-n multiplications of upper and lower n-bit portions of the imaginary part of the 2n-bit multiplicand by a real part of the n-bit multiplicand using a second two of the four multipliers of the first four-multiplier unit, shifting a result of the second respective multiplication involving the upper portion relative to a result of the second respective multiplication involving the lower portion, and adding the second respective multiplications to form a second partial product, and (3) adding the first and second partial products; and (b) computing a real part of the complex multiplication in a second of the four-multiplier units by (1) performing a first n-by-n multiplication of the upper n-bit portion of the real part of the 2n-bit multiplicand by the real part of the n-bit multiplicand using a first of the four multipliers of the second four-multiplier unit, performing a second n-by-n multiplication of the upper n-bit portion of the imaginary part of the 2n-bit multiplicand by the imaginary part of the n-bit multiplicand using a second of the four multipliers of said second four-multiplier unit, and performing a first subtraction of a result of the second multiplication from the result of the first multiplication to form a third partial product, (2) performing a first n-by-n multiplication of the lower n-bit portion of the real part of the 2n-bit multiplicand by the real part of the n-bit multiplicand using a third of the four multipliers of the second four-multiplier unit, performing a fourth n-by-n multiplication of the lower n-bit portion of the imaginary part of the 2n-bit multiplicand by the imaginary part of the n-bit multiplicand using a fourth of the four multipliers of the second four-multiplier unit, and performing a first subtraction of a result of the second multiplication from said result of the first multiplication to form a fourth partial product, (3) shifting a result of the third partial product relative to the fourth partial product, and (4) adding the third partial product to the fourth partial product.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

The invention will now be described with reference to FIGS. 1-6 in the context of a 54-bit-by-54-bit multiplication, which maps well onto the 18-bit multipliers of the DSP block of the aforementioned STRATIX® II PLD, and which can be used to implement double-precision multiplication under the IEEE 754-1985 standard. However, the invention can be used with specialized processing blocks of different sizes.

Figure 1:
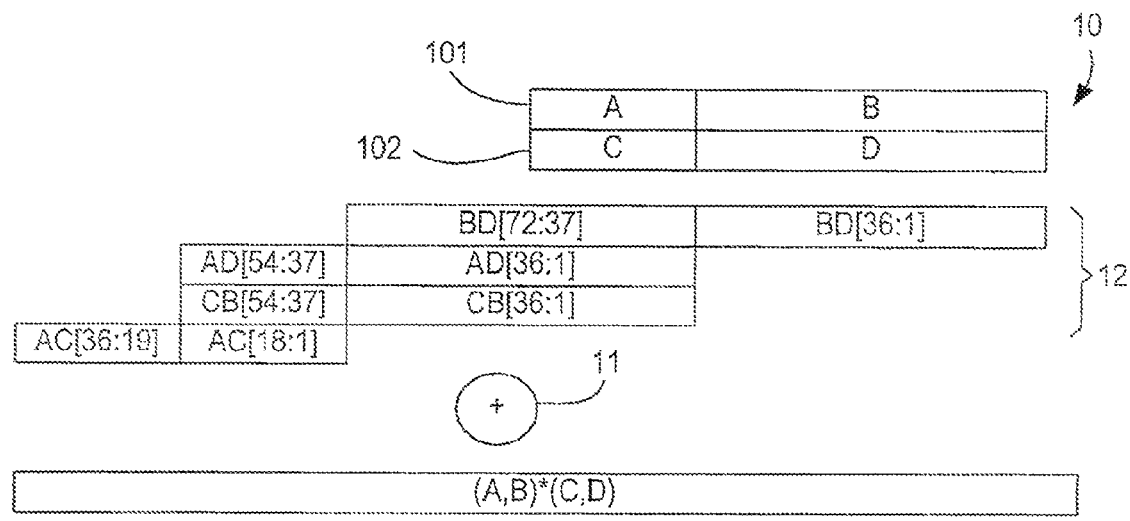
FIG. 1 is a representation of the decomposition of a 54-bit-by-54-bit multiplication into a sum of partial products.

FIG. 1 shows the decomposition of a 54-bit-by-54-bit multiplication 10 into a sum 11 of partial products 12 that can be implemented using 18-bit-by-18-bit multipliers to yield product 13. In the first multiplicand 101, A contains the 18 most significant bits, and B contains the 36 least significant bits. In the second multiplicand 102, C contains the 18 most significant bits, and C contains the 36 least significant bits. The result (A,B)×(C,D) can be calculated as B×D+((A×D+C×B)<<36)+((A×C)<<72), where "<<n" indicates that the result of the expression to which it relates is shifted to the left by n places.

Figure 2:
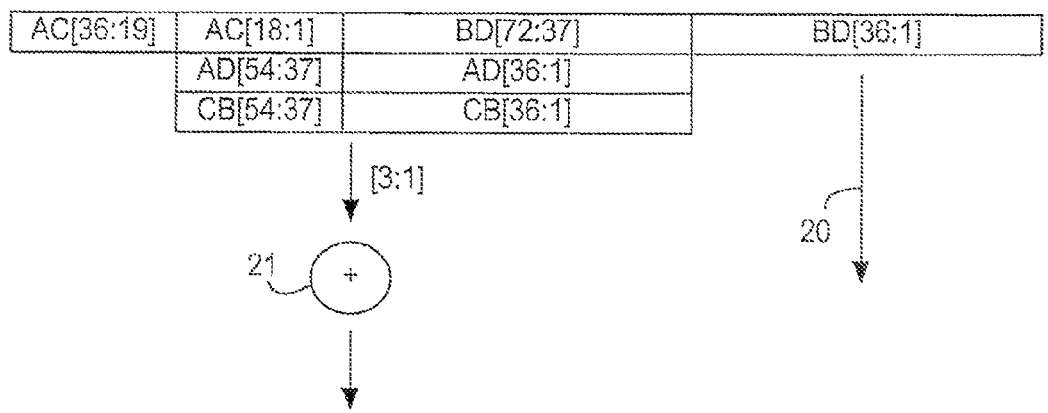
FIG. 2 is a representation of the alignment of the partial products of FIG. 1 for addition.

The intermediate values required for a floating point mantissa multiplication preferably are unsigned when performing a 54-bit multiplication—i.e., they include a 52-bit mantissa preceded by "01." The intermediate values can be aligned as in FIG. 2, providing as outputs 36-bit output 20 and 3-level 72-bit addition 21.

In the DSP block of the aforementioned STRATIX® II PLD, as well as in an improved DSP block described in copending, commonly-assigned U.S. patent application Ser. Nos. 11/447,329, 11/447,370, 11/447,472, 11/447,474, all filed Jun. 5, 2006, Ser. No. 11/426,403, filed Jun. 26, 2006, and Ser. No. 11/458,361, filed Jul. 18, 2006, each of which is hereby incorporated herein in its respective entirety, four multipliers are arranged in a unit, which may be referred to as a block or a half-block, along with compressors, adders, shifters and multiplexers, to form and add the various partial products.

As applied to the current problem illustrated in FIGS. 1 and 2, that DSP block architecture can support the 36-bit-by-36-bit multiplication (B×D) and the 18-bit-by-18-bit multiplication (A×C), but the multiplexer pattern of that architecture cannot support the connections necessary to add together the two 18-bit-by-36-bit multiplications (A×D and C×B). Each of the 18-bit-by-36-bit multiplications is supported individually, but the results must be routed out of the DSP block, and added in the general-purpose programmable logic of the PLD. This consumes a large amount of general-purpose programmable logic as well as routing and interconnect resources.

In accordance with the present invention, the intermediate multiplexer arrangement of the DSP block is changed, as compared to the aforementioned DSP block, in a manner that allows the sum of two 18-bit-by-36-bit multiplications to be produced in a single four-multiplier block/half-block. As a result, all of the partial products necessary for a 54-bit-by-54-bit multiplication can be performed and at least partially summed together within a single four-multiplier block/half-block.

Figure 3:
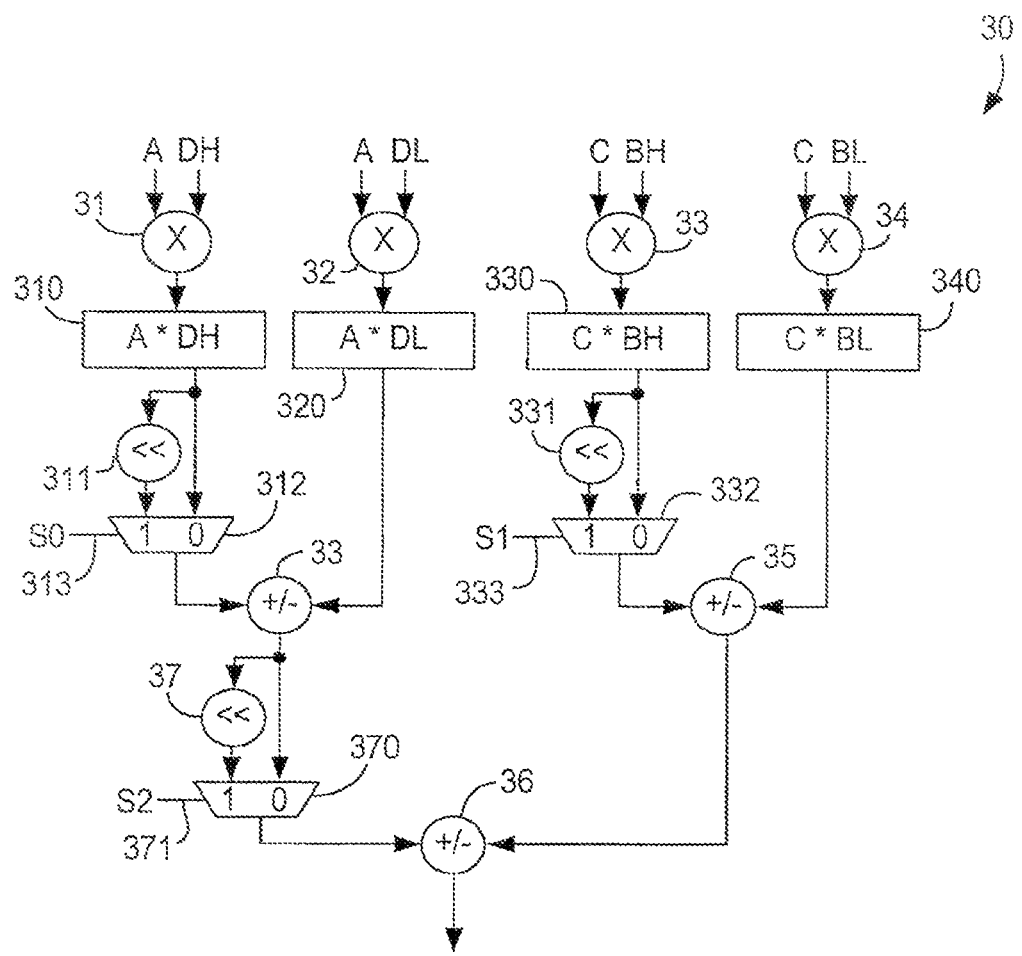
FIG. 3 is schematic representation of a portion of a specialized processing block for use in a first preferred embodiment of the present invention.
Figure 4:
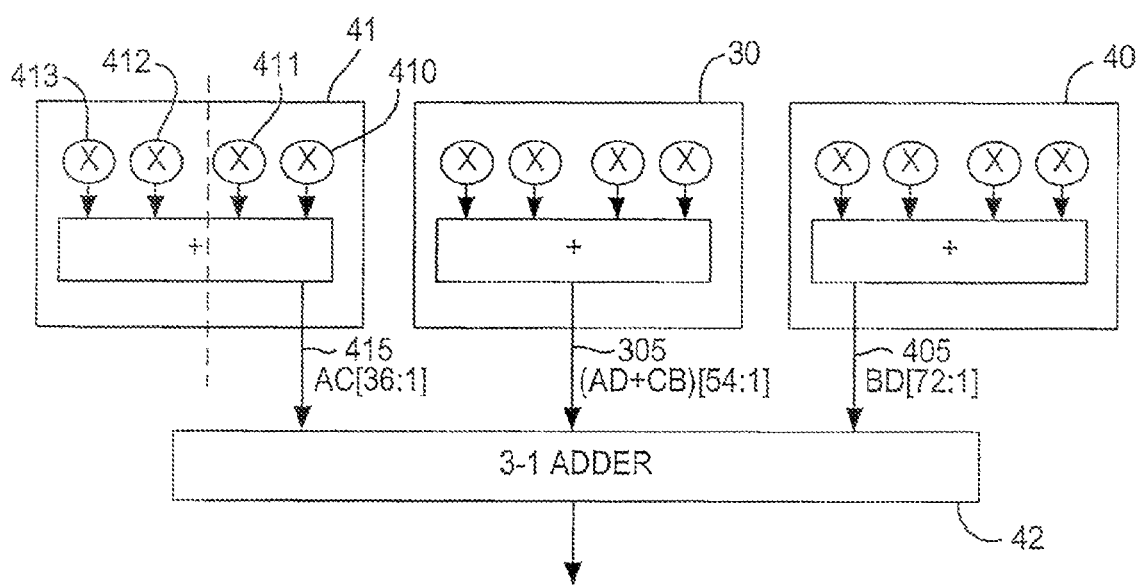
FIG. 4 is a schematic representation of the performance of a 54-bit-by-54-bit multiplication in a preferred embodiment of the present invention.
Figure 5:
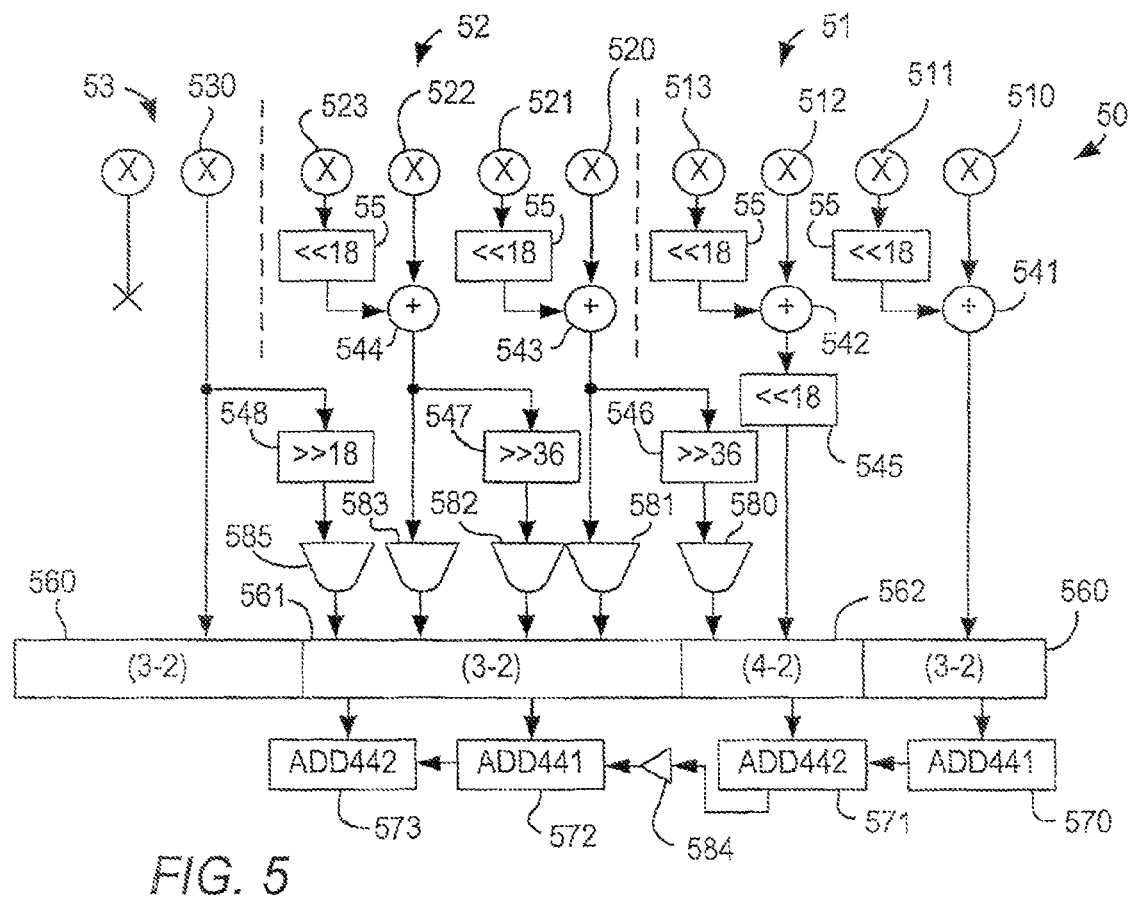
FIG. 5 is a schematic representation of a group of specialized processing blocks for use in another preferred embodiment of the present invention.

In a first preferred embodiment illustrated in FIGS. 3 and 4, for a pair of multiplicands A and D, D may be split into most significant and least significant halves, or DH and DL. The product A×D can then be expressed as (A×DH)<<18+A×DL. (A×DH) preferably is provided at 310 by multiplier 31, and is then shifted left 18 bits by shifter 311, selected by multiplexer 312 under control of signal 313. A×DL preferably is provided at 320 by multiplier 32. The product A×D is then preferably provided by adding partial products 310 and 320 at adder 350, which may include a 4:2 compressor, and a 30-bit adder and a 24-bit adder concatenated together (not shown).

A second pair of multiplicands C and B can be treated similarly to provide (C×BH)<<18+C×BL. (C×BH) preferably is provided at 330 by multiplier 33, and is then shifted left 18 bits by shifter 331, selected by multiplexer 332 under control of signal 333. C×BL preferably is provided at 340 by multiplier 34. The product C×B is then preferably provided by adding partial products 330 and 340 at adder 351, which may include a 4:2 compressor, and a 30-bit adder and a 24-bit adder concatenated together (not shown).

The two 54-bit sums of the 18-bit-by-36-bit multiplications A×D and C×B preferably are then added together at adder 36, which may include a 4:2 compressor, and two 44-bit adders concatenated together (not shown). Although a 18-bit shifter 37 is provided for selectively left-shifting the output of adder 33 as selected by multiplexer 370 under control of signal 371, for the purpose of this 54-bit addition, sum 33 (A×D) is not shifted.

Specifically, the three shifters 311, 331, 37, under control of signals 312, 332, 371, allows specialized processing block 30 to be used for multiple functions. For example, for a sum of four 18-bit-by-18-bit multiplications, each of signals 312, 332, 371 preferably is set to select its respective unshifted result. For a single 36-bit-by-36-bit multiplication, each of signals 312, 332, 371 preferably is set to select its respective shifted result. And as already stated, for performing the two 18-bit-by-36-bit partial products of a 54-bit-by-54-bit multiplication, each of signals 312, 332 preferably is set to select its respective shifted result, while signal 371 preferably is set to select its unshifted result.

As seen in FIG. 4, the 54-bit-by-54-bit multiplication is performed by using specialized processing block/half-block 40 to perform the 36-bit-by-36-bit partial product B×D, using specialized processing block/half-block 30 to perform and sum the two 18-bit-by-36-bit partial products A×D and C×B, and using specialized processing block/half-block 41 to perform the single 18-bit-by-18-bit multiplication A×C. Note that only one of the four multipliers 410-413 in block/half-block 41 is used, although as explained in above-incorporated application Ser. No. 11/447,472, if block/half-block 41 is the one described in that application, using only one multiplier 410 requires sacrificing a second multiplier 411. However, in that embodiment, at least multipliers 412, 413 remain available for other purposes, and in other embodiments even multiplier 411 may be available.

In accordance with the embodiment of the present invention depicted in FIGS. 3 and 4, the three partial products or sums of partial products 405, 305 and 415 are added by adder 42, which preferably is created outside the specialized processing blocks 40, 30, 41 in programmable logic of the PLD of which specialized processing blocks 40, 30, 41 are a part.

In the embodiment of FIGS. 3 and 4, it is still necessary to use general-purpose programmable logic, routing and interconnect resources for the final addition 42. In a second preferred embodiment 50 shown in FIG. 5, a 54-bit-by-54-bit multiplication can be performed substantially entirely in specialized processing blocks on a PLD, substantially without resort to the general-purpose programmable logic of that PLD. In embodiment 50, preferably two four-multiplier units 51, 52 and a portion of third four-multiplier unit 53 are used. Preferably, each of these four-multiplier units 51-53 is based on half-blocks of the specialized processing block described in above-incorporated application Ser. No. 11/447,472, modified as described herein. Thus, a full one such block and a portion of a second such block preferably are used.

In embodiment 50, each half-block 51, 52 (and half-block 53, but not all components are shown because only one multiplier 530 is used from that half-block 53) preferably has four 18-bit-by-bit multipliers 510-513, 520-523, preferably arranged in pairs 510-511, 512-513, 520-521 and 522-523, with the output of the members of each pair preferably being added together by respective 54-bit adders 541-544 after the output of one member of pair has been shifted left 18 bits by respective shifter 55. One or more of shifters 55 may be programmably bypassable (not shown) as in the embodiment of FIGS. 3 and 4, above, but in this embodiment, for performing a 54-bit-by-54-bit multiplication, shifters 55 preferably are not bypassed (even if they are bypassable).

In the specialized processing block described in above-incorporated application Ser. No. 11/447,472, the output of adder 541, and the output of adder 542 after being shifted left 18 bits by shifter 545, would be added by 3:2 compressor 560 and chained carry/propagate adders 570, 571. Similarly, the outputs of adders 543 and 544 would be added by 3:2 compressor 561 and chained carry/propagate adders 572, 573. In accordance with the present invention, a 4:2 compressor 562 as well as two 36-bit right-shifters 546, 547 are added. A number of AND gates 580-583 are added as selectors as described below, although multiplexers also could be used for that purpose, and AND gate 584 is added to chain together adders 570, 571 with adders 572, 573. In addition, 18-bit right-shifter 548 and AND gate 585 are added, bridging half-blocks 52, 53 which are in different specialized processing blocks. Note that a further 18-bit right-shifter (not shown) like shifter 548 and a further AND gate (not shown) like AND gate 585, could connect half-block 51 to another half-block to the right (not shown) in a similar manner.

When not being used in the 54-bit-by-54-bit multiplication mode, each specialized processing block operates like that shown in above-incorporated application Ser. No. 11/447, 472. As such, the second input (not shown) of each of AND gates 580, 582, 584 and 585 is a "0" so that shifters 546-548 are not in use and the carry/propagate adder chains of the two half-blocks remain separate. Similarly, the second input (not shown) of each of AND gates 581, 583 is a "1" so that each partial product feeds directly into its respective 3:2 or 4:2 compressor. Note that in this case, with a "0" on the second input of AND gate 580, 4:2 compressor 562 will act like a 3:2 compressor 560, 561.

When the specialized processing blocks are being used in the 54-bit-by-54-bit multiplication mode, the second input (not shown) of each of AND gates 580, 582, 584 and 585 is a "1" so that shifters 546-548 are in use and the carry/propagate adder chains of the two half-blocks are connected.

Because this is a 72-bit addition, the carry-out from 44-bit adder 571 to 44-bit adder 572 (via AND gate 584) preferably is taken not from the end of adder 571, but preferably from the 29th bit of adder 571, which, including adder 570, is the 73rd bit position, representing the carry-out from a 72-bit addition. Although it relies on more than one specialized processing block, this arrangement adds together all of the partial products substantially without resorting to general-purpose programmable logic of the PLD.

Figure 6:
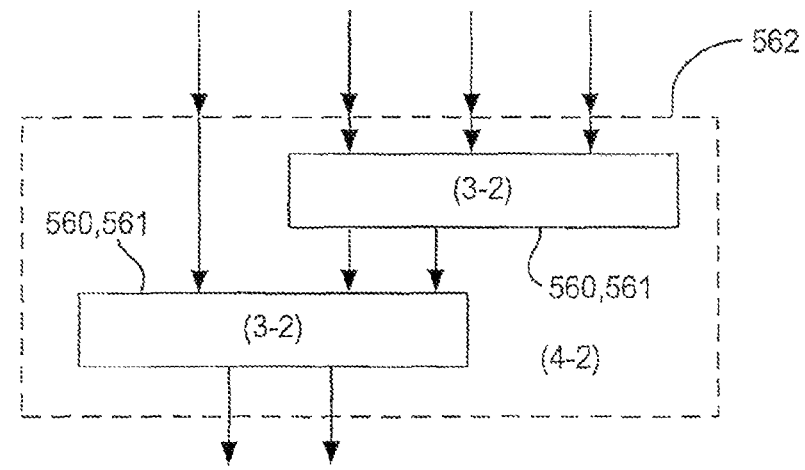
FIG. 6 is a schematic representation of a 4:2 compressor used in the embodiment of FIG. 5.

FIG. 6 shows schematically how 4:2 compressor 562 may be configured from two 3:2 compressors 560 (or 561).

Figure 7:
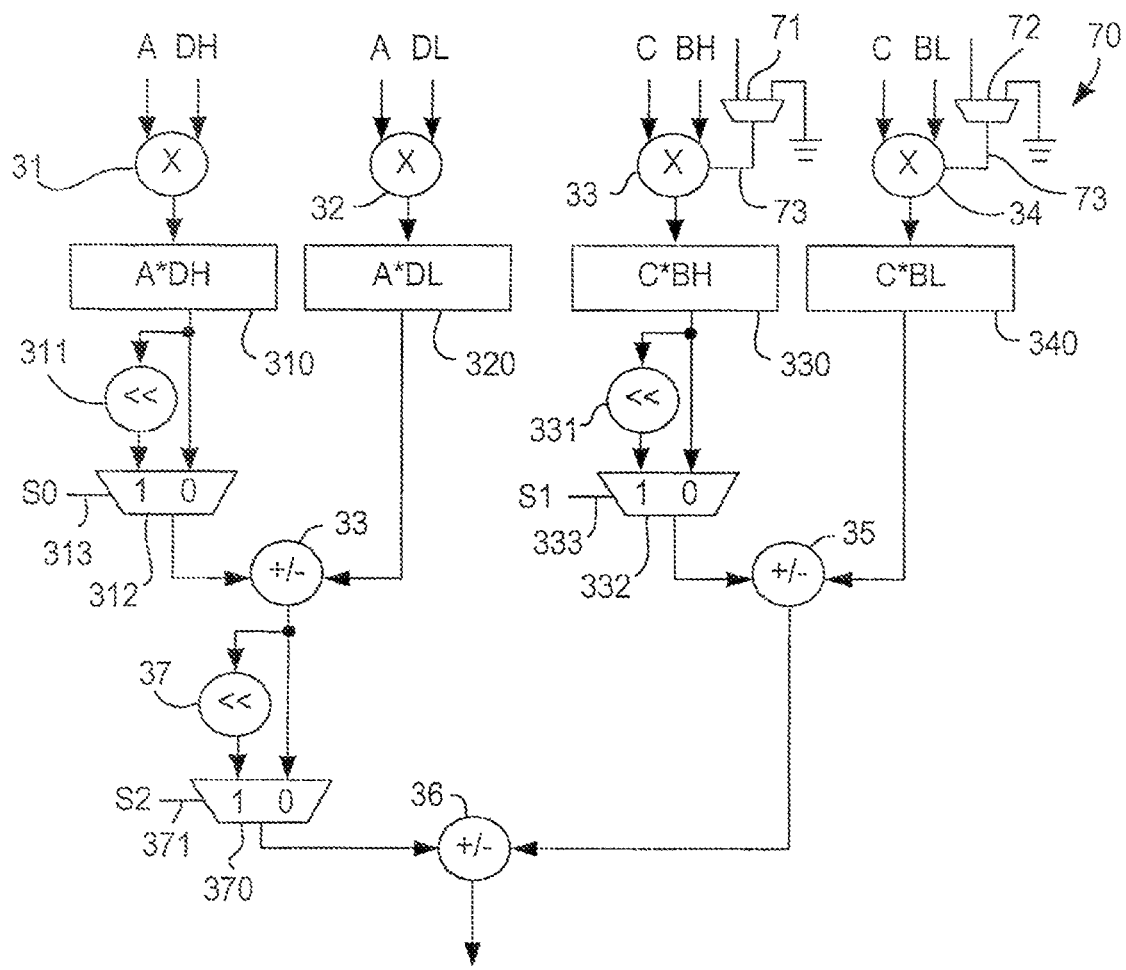
FIG. 7 is a schematic representation of a portion of a specialized processing block configured to perform part of a 36-bit-by-18-bit complex multiplication in another preferred embodiment of the present invention.

The invention will now be described with reference to FIGS. 7-9 in the context of a complex 36-by-18 multiplication, as well as a signed 54-bit-by-54-bit multiplication.

A 36-bit-by-18-bit complex multiplication can be broken down into eight 18-bit-by-18-bit multiplications, with appropriate shifters and adders. In accordance with this embodiment, all eight 18-but-by-18-bit multiplications and associated logic can be implemented in a single specialized processing block.

A 36-bit-by-18-bit complex multiplication can be decomposed as follows:

$$(A[35:0]+jC[35:0])\times(B[17:0]+jD[17:0])=(\{AH,AL\}+j\{CH,CL\})\times(B+jD)=((\{AH,AL\}\times B)-(\{CH,CL\}\times D))+j((\{AH,AL\}\times D)+(\{CH,CL\}\times B))=\text{Real:}$$
$$[((AH\times B)<<18)+(AL\times B)]-[((CH\times D)<<18)+(CL\times D)]$$

$$\text{Imag: }[((AH\times D)<<18)+(AL\times D)]+[((CH\times B)<<18)+(CL\times B)]$$

The imaginary part may be implemented in embodiment 30 described above in FIG. 3, using the two first level shifters 311, 331, and bypassing the second level shifter 37. With regard to the real part, the subtraction required in the real part requires that signed multiplication be used. However, in the 36-bit-by-36-bit mode of embodiment 30, the lower 18 bits of a 36-bit operand are always treated as unsigned regardless of the sign control signal, because the sign information is in the upper 18 bits. Thus, in FIG. 3, the first multiplicand (A) of multiplier 32, the second multiplicand (BH) of multiplier 33, and both multiplicands (C, BL) of multiplier 34 are forced into unsigned mode. Therefore, embodiment 30 cannot compute the real part of a 36-bit-by-18-bit complex multiplication, nor can it compute the imaginary part if signed multiplication is required.

Embodiment 70 (FIG. 7) can compute the real part of a 36-bit-by-18-bit complex multiplication, as well as the imaginary part if signed multiplication is required. For example, the real part can be rewritten as:

$$\text{Real: }[((AH\times B)<<18)+(AL\times B)]+[((CH\times(-D))<<18)+(CL\times(-D))]$$

In embodiment 70, as in embodiment 30, the two first level shifters 311, 331 are used, and the second level shifter 37 is bypassed. In addition, at least the second multiplicands of multipliers 33 and 34 are not forced to unsigned mode, allowing the negated value of D to be input to those multipliers. This requires that the negation of D take place in other circuitry or in programmable logic of the PLD. The inputs to multipliers 33, 34 can be made unforced by connecting a respective one of multiplexers 71, 72 to the respective sign control inputs 73 of multipliers 33, 34, allowing each sign control input 73 to be connected either to ground (forced to unsigned) or to the sign control signal associated with the respective multiplicand.

Figure 8:
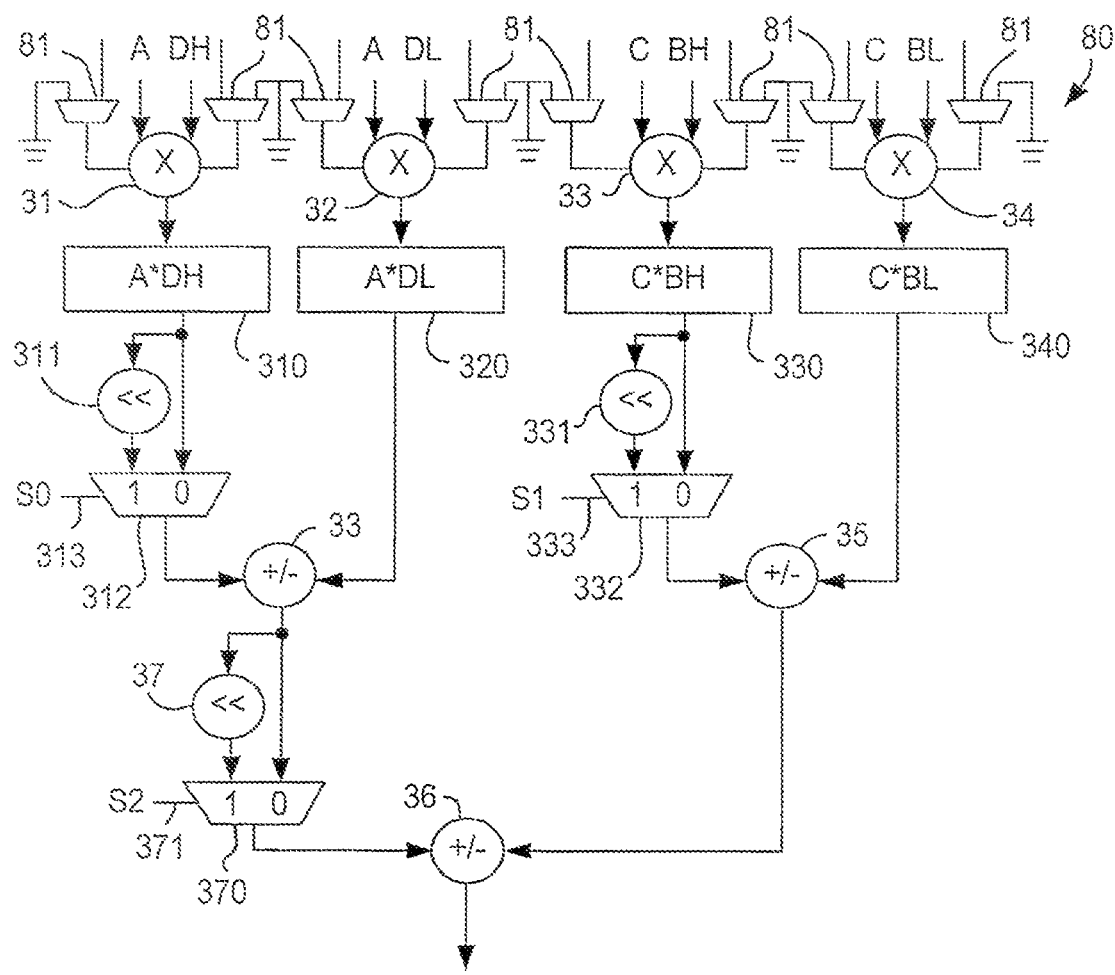
FIG. 8 is schematic representation of another preferred embodiment of the portion of the specialized processing block of FIG. 7.

In a further embodiment 80, shown in FIG. 8, which is an extension of embodiment 70, all multiplicands have multiplexers 81 similar to multiplexers 71, 72, that allow any multiplicand either to be forced to be unsigned, or to be signed or unsigned according to an associated sign control signal. This would allow not only the implementation of a 36-bit-by-18-bit complex multiplication as described above, but also the implementation of a 54-bit-by-54-bit signed multiplication, whereas the 54-bit-by-54-bit multiplication described above is only an unsigned multiplication.

In embodiment 80, signed 54-bit-by-54-bit multiplication can be implemented by applying appropriate control signals to force all the lower 18-bit multiplicands to be unsigned, while allowing the upper 18-bit multiplicands, which carry the sign information, to be signed. Similarly, in embodiment 80, complex 36-bit-by-18-bit multiplication can be implemented by forcing all multiplicands to be signed except those noted above in connection with embodiment 70.

Embodiment 80 also may be used to implement the entire real part of a complex multiplication without the external negation required in embodiment 70. The real part can be rewritten:

$$\text{Real: }[((AH\times B)<<18)+(AL\times B)]+[((CH\times(-D))<<18)+(CL\times(-D))]=\text{Real: }[(AH\times B)-(CH\times D)]<<18+[(AL\times B)-(CL\times D)]$$

Figure 9:
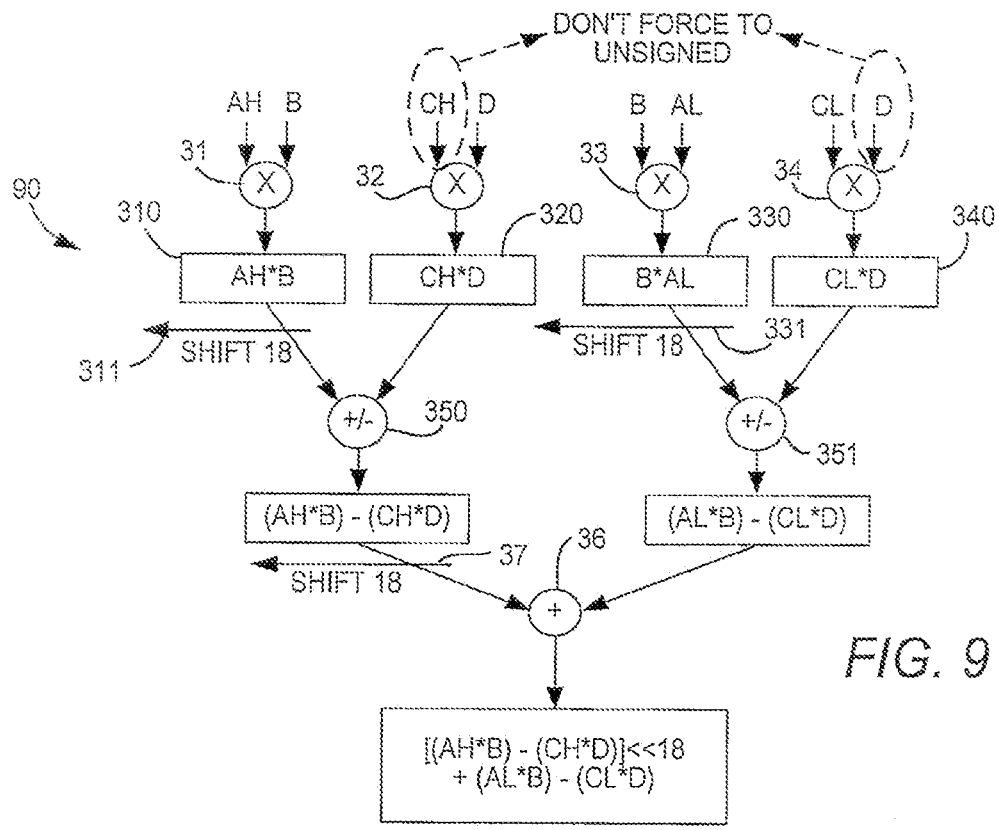
FIG. 9 is a schematic representation of a portion of a specialized processing block configured to perform the real part of a 36-bit-by-18-bit complex multiplication in another preferred embodiment of the present invention.

This can be implemented by embodiment 90 of FIG. 9, bypassing the first-level shifters 311, 331 and using the subtraction capability of adder/subtractors 350, 351, and also using second-level shifter 37. For this embodiment 90, the first multiplicand of multiplier 32 and the second multiplicand of multiplier 34 would have to be set not to be forced to be unsigned.

Figure 10:
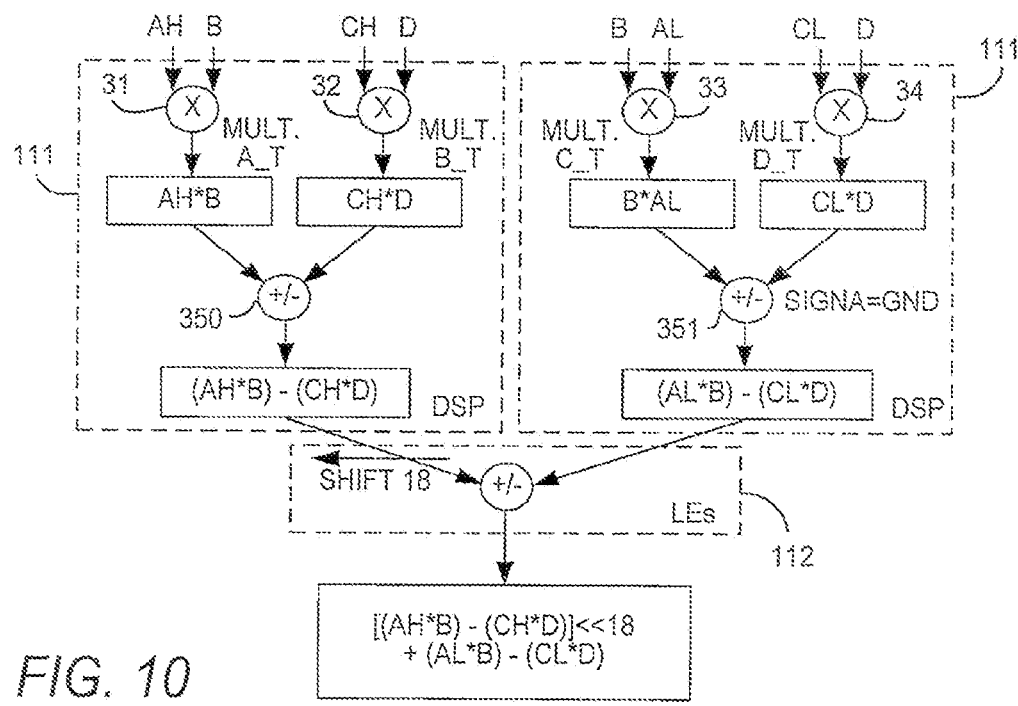
FIG. 10 is a schematic representation of the performance of a portion of a 36-bit-by-17-bit complex multiplication in accordance with another embodiment of the present invention.

Embodiment 90, with the first-level shifters bypassed, is similar to the specialized processing block/half-block of the PLD of the above-incorporated application Ser. No. 11/447,472, which does not have the shifters. This suggests that at least the first stage of a large multiplication such as a 36×18 complex multiplication can be carried out more efficiently in such a PLD if it is broken down mathematically as in embodiment 90. This is illustrated as embodiment 100 of FIG. 10, in which the first-stage multiplications are performed by multipliers 31-34 and then combined using adder/subtractors 350, 351. However, because the specialized processing block/half-block of the PLD of the above-incorporated application Ser. No. 11/447,472, illustrated in FIG. 10 at 111, lacks the necessary shifter 37, the shifting and further addition in embodiment 100 is carried out in programmable logic 112 of the PLD. Although embodiment 100 has been described as a 36×18 complex multiplication, because of limitations of the way that specialized processing block/half-block 111 forms the sum of two 18-bit-by-18-bit multiplications (as described in above-incorporated application Ser. No. 11/447,472), there is no provision for a carry-out bit, and therefore this embodiment actually is limited in that PLD to a 36×17 complex multiplication. However, in the specialized processing block/half-block of the aforementioned STRATIX® II PLD (or in the earlier STRATIX® PLD also available from Altera Corporation), this embodiment 100 could be used for a 36×18 complex multiplication.

Thus it is seen that a large multiplication that requires more than one specialized processing block of a PLD can be performed using fewer or no general-purpose programmable resources of the PLD.

Figure 11:
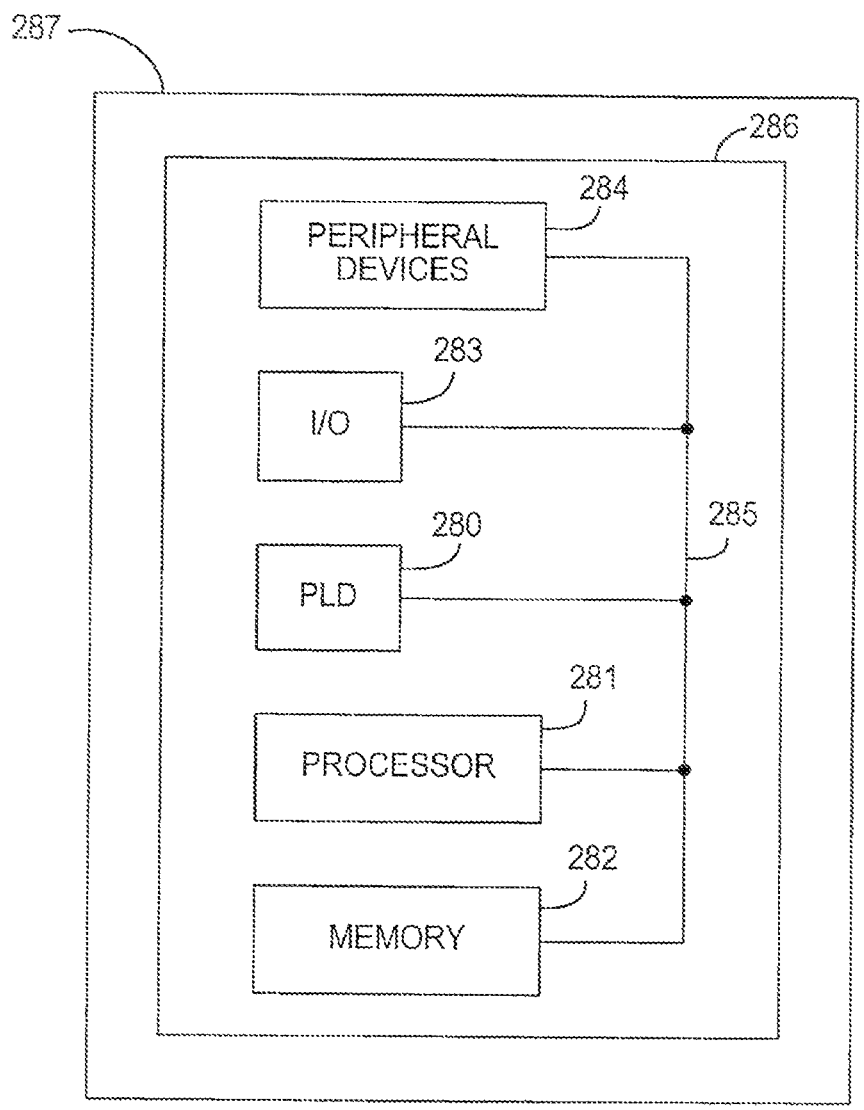
FIG. 11 is a simplified block diagram of an illustrative system employing a programmable logic device incorporating the present invention.

A PLD 280 incorporating such circuitry according to the present invention may be used in many kinds of electronic devices. One possible use is in a data processing system 900 shown in FIG. 11. Data processing system 900 may include one or more of the following components: a processor 281; memory 282; I/O circuitry 283; and peripheral devices 284. These components are coupled together by a system bus 285 and are populated on a circuit board 286 which is contained in an end-user system 287.

System 900 can be used in a wide variety of applications, such as computer networking, data networking, instrumentation, video processing, digital signal processing, or any other application where the advantage of using programmable or reprogrammable logic is desirable. PLD 280 can be used to perform a variety of different logic functions. For example, PLD 280 can be configured as a processor or controller that works in cooperation with processor 281. PLD 280 may also be used as an arbiter for arbitrating access to a shared resources in system 900. In yet another example, PLD 280 can be configured as an interface between processor 281 and one of the other components in system 900. It should be noted that system 900 is only exemplary, and that the true scope and spirit of the invention should be indicated by the following claims.

Various technologies can be used to implement PLDs 280 as described above and incorporating this invention.

Instructions for carrying out the method according to this invention may be encoded on a machine-readable medium, to be executed by a suitable computer or similar device to implement the method of the invention for programming PLDs. For example, a personal computer may be equipped with an interface to which a PLD can be connected, and the personal computer can be used by a user to program the PLD using a suitable software tool, such as the QUARTUS® II software available from Altera Corporation, of San Jose, Calif.

Figure 12:
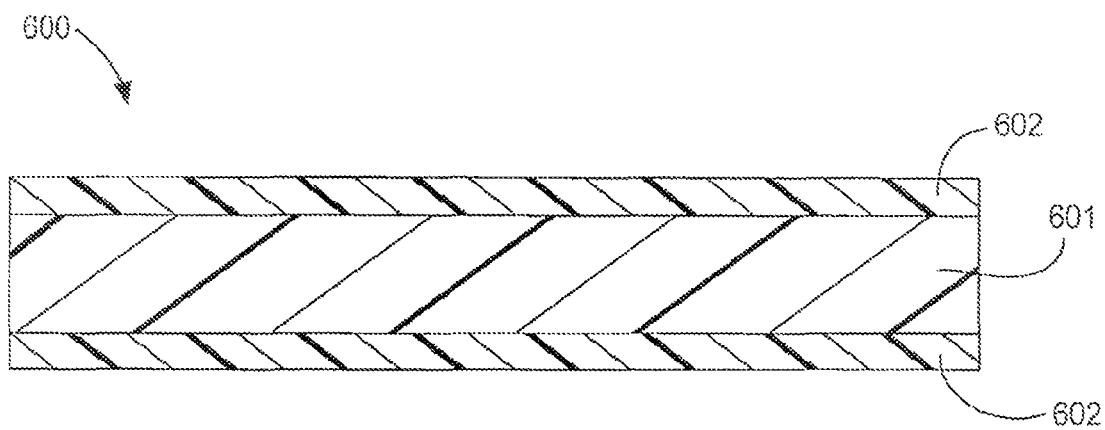
FIG. 12 is a cross-sectional view of a magnetic data storage medium encoded with a set of machine-executable instructions for performing the method according to the present invention.

FIG. 12 presents a cross section of a magnetic data storage medium 600 which can be encoded with a machine executable program that can be carried out by systems such as the aforementioned personal computer, or other computer or similar device. Medium 600 can be a floppy diskette or hard disk, or magnetic tape, having a suitable substrate 601, which may be conventional, and a suitable coating 602, which may be conventional, on one or both sides, containing magnetic domains (not visible) whose polarity or orientation can be altered magnetically. Except in the case where it is magnetic tape, medium 600 may also have an opening (not shown) for receiving the spindle of a disk drive or other data storage device.

The magnetic domains of coating 602 of medium 600 are polarized or oriented so as to encode, in manner which may be conventional, a machine-executable program, for execution by a programming system such as a personal computer or other computer or similar system, having a socket or peripheral attachment into which the PLD to be programmed may be inserted, to configure appropriate portions of the PLD, including its specialized processing blocks, if any, in accordance with the invention.

Figure 13:
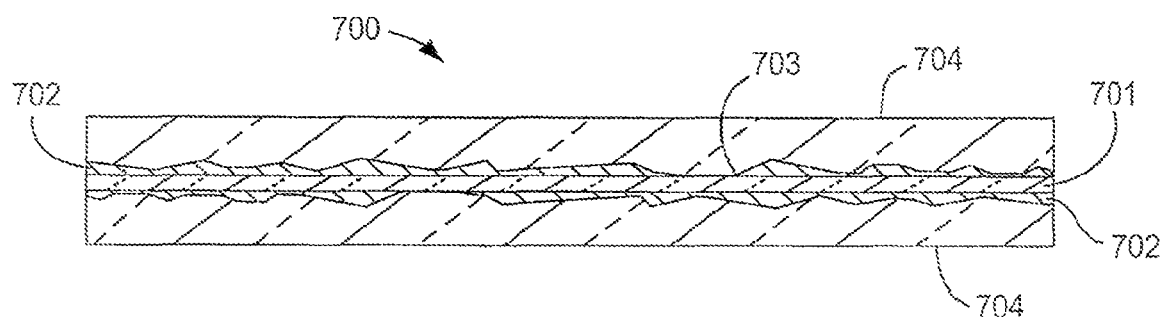
FIG. 13 is a cross-sectional view of an optically readable data storage medium encoded with a set of machine executable instructions for performing the method according to the present invention.

FIG. 13 shows a cross section of an optically-readable data storage medium 700 which also can be encoded with such a machine-executable program, which can be carried out by systems such as the aforementioned personal computer, or other computer or similar device. Medium 700 can be a conventional compact disk read only memory (CD-ROM) or digital video disk read only memory (DVD-ROM) or a rewriteable medium such as a CD-R, CD-RW, DVD-R, DVD-RW, DVD+R, DVD+RW, or DVD-RAM or a magneto-optical disk which is optically readable and magneto-optically rewriteable. Medium 700 preferably has a suitable substrate 701, which may be conventional, and a suitable coating 702, which may be conventional, usually on one or both sides of substrate 701.

In the case of a CD-based or DVD-based medium, as is well known, coating 702 is reflective and is impressed with a plurality of pits 703, arranged on one or more layers, to encode the machine-executable program. The arrangement of pits is read by reflecting laser light off the surface of coating 702. A protective coating 704, which preferably is substantially transparent, is provided on top of coating 702.

In the case of magneto-optical disk, as is well known, coating 702 has no pits 703, but has a plurality of magnetic domains whose polarity or orientation can be changed magnetically when heated above a certain temperature, as by a laser (not shown). The orientation of the domains can be read by measuring the polarization of laser light reflected from coating 702. The arrangement of the domains encodes the program as described above.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. For use in a programmable logic device having a plurality of specialized processing blocks, each of said specialized processing blocks having at least four n-by-n multipliers arranged in four-multiplier units, a method of performing a signed 3n-by-3n multiplication operation, said method comprising:
   performing a 2n-by-2n multiplication using four of said n-by-n multipliers in a first of said four-multiplier units;
   performing an n-by-n multiplication using one of said n-by-n multipliers in a second of said four-multiplier units; and
   performing first and second 2n-by-n multiplications in a third of said four-multiplier units, using two of said n-by-n multipliers for each of said 2n-by-n multiplications; wherein:
   in each of said multiplications, multiplicands representing n most significant bits are treated as signed operands and multiplicands representing n least significant bits are forced to be unsigned; said method further comprising:
   shifting a second partial product of each of said 2n-by-n multiplications to align it with a first partial product of each of said 2n-by-n multiplications for addition within said third four-multiplier unit; and
   adding results of said multiplications from said first, second and third four-multiplier units.

2. The method of claim 1 wherein said adding comprises adding said results in general-purpose programmable logic of said programmable logic device.

3. The method of claim 2 wherein:
   said performing first and second 2n-by-n multiplications comprises, for each respective one of said first and second 2n-by-n multiplications:
   performing a respective most significant bit multiplication using one said multiplier in said third four-multiplier unit to form a respective most significant bit partial product, and
   performing a respective least significant bit multiplication using another said multiplier in said third four-multiplier unit to form a respective least significant bit partial product;
   said shifting comprises shifting each respective most significant bit partial product to the left without shifting either respective least significant bit partial product; and
   said addition within said third four-multiplier unit excludes further shifting of partial products.

4. The method of claim 3 further comprising selecting control signals to perform said shifting and said addition without further shifting.

5. The method of claim 1 wherein each said specialized processing block comprises two said four-multiplier units.

6. A programmable logic device having a plurality of specialized processing blocks, each of said specialized processing blocks having at least four n-by-n multipliers arranged in four-multiplier units, said programmable logic device being configured to perform a signed 3n-by-3n multiplication operation and comprising:
four of said n-by-n multipliers in a first of said four-multiplier units configured to perform a 2n-by-2n multiplication;
one of said n-by-n multipliers in a second of said four-multiplier units configured to perform an n-by-n multiplication;
a third of said four-multiplier units configured to perform first and second 2n-by-n multiplications, using two of said n-by-n multipliers for each of said 2n-by-n multiplications;
circuitry at multiplicand inputs of at least one of said multipliers for selectably forcing at least one of said inputs to be unsigned;
a shifter configured to shift a second partial product of each of said 2n-by-n multiplications to align it with a first partial product of each of said 2n-by-n multiplications for addition within said third four-multiplier unit; and
circuitry configured to add results of said multiplications from said first, second and third four-multiplier units.

7. The configured programmable logic device of claim 6 wherein said adding comprises adding said results in general-purpose programmable logic of said programmable logic device.

8. The configured programmable logic device of claim 7 wherein:
said programmable logic device is configured to perform said first and second 2n-by-n multiplications by, for each respective one of said first and second 2n-by-n multiplications:
performing a respective most significant bit multiplication using one said multiplier in said third four-multiplier unit to form a respective most significant bit partial product, and
performing a respective least significant bit multiplication using another said multiplier in said third four-multiplier unit to form a respective least significant bit partial product;
said programmable logic device is configured to shift each respective most significant bit partial product to the left without shifting either respective least significant bit partial product; and
said circuitry configured to add excludes further shifting of partial products.

9. The configured programmable logic device of claim 8 further comprising selectors responsive to selection control signals to perform said shifting and said addition without further shifting.

10. The configured programmable logic device of claim 6 wherein each said specialized processing block comprises two said four-multiplier units.

11. The configured programmable logic device of claim 10 wherein said circuitry configured to add is located substantially within one said specialized processing block.

12. The configured programmable logic device of claim 6 wherein said circuitry for selectably forcing at least one of said inputs to be unsigned comprises a multiplexer at said multiplicand input, said multiplexer controllably selecting, for input to a sign control input associated with said multiplicand input, between a first signal forcing said multiplicand input to be unsigned, and a second signal representing sign information for said multiplicand input.

13. The configured programmable logic device of claim 6 wherein said circuitry for selectably forcing at least one of said inputs to be unsigned comprises one said multiplexer at at least one multiplicand input of each said multiplier.

14. The configured programmable logic device of claim 13 wherein said circuitry for selectably forcing at least one of said inputs to be unsigned comprises one said multiplexer at each multiplicand input of each said multiplier.

15. A data storage medium encoded with machine-executable instructions for performing a method of programmably configuring a programmable logic device to perform a signed 3n-by-3n multiplication operation, wherein said programmable logic device has a plurality of specialized processing blocks, each of said specialized processing blocks having at least four n-by-n multipliers arranged in four-multiplier units, said instructions comprising:
instructions for configuring four of said n-by-n multipliers in a first of said four-multiplier units to perform a 2n-by-2n multiplication;
instructions for configuring one of said n-by-n multipliers in a second of said four-multiplier units to perform an n-by-n multiplication;
instructions for configuring a third of said four-multiplier units to perform first and second 2n-by-n multiplications, using two of said n-by-n multipliers for each of said 2n-by-n multiplications;
instructions for configuring multiplicand inputs in any of said multiplications to be selectably treatable as signed operands or unsigned operands;
instructions for configuring a shifter to shift a second partial product of each of said 2n-by-n multiplications to align it with a first partial product of each of said 2n-by-n multiplications for addition within said third four-multiplier unit; and
instructions for configuring circuitry to add results of said multiplications from said first, second and third four-multiplier units.

16. The data storage medium of claim 15 wherein said instructions for configuring circuitry to add comprise instructions for configuring general-purpose programmable logic of said programmable logic device to add said results.

17. The data storage medium of claim 16 comprising:
instructions to configure said programmable logic device to perform said first and second 2n-by-n multiplications including, for each respective one of said first and second 2n-by-n multiplications:
instructions to configure said programmable logic device to perform a respective most significant bit multiplication using one said multiplier in said third four-multiplier unit to form a respective most significant bit partial product, and
instructions to configure said programmable logic device to perform a respective least significant bit multiplication using another said multiplier in said third four-multiplier unit to form a respective least significant bit partial product; and
instructions to configure said programmable logic device to perform to shift each respective most significant bit partial product to the left without shifting either respective least significant bit partial product; wherein:
said instructions to configure said circuitry to add excludes further shifting of partial products.

18. The data storage medium of claim 17 wherein said instructions further comprise instructions to configure selectors responsive to selection control signals to perform said shifting and said addition without further shifting.

19. The data storage medium of claim 15 wherein said instructions are for configuring a programmable logic device wherein each said specialized processing block comprises two said four-multiplier units.

20. The data storage medium of claim 19 wherein said instructions configure said circuitry to add substantially within one said specialized processing block.

21. The data storage medium of claim 15 wherein said instructions for configuring multiplicand inputs in any of said multiplications to be selectably treatable as signed operands or unsigned operands include instructions for configuring a respective multiplexer at each respective said multiplicand input, each said respective multiplexer being configured to controllably select, for input to a sign control input associated with said respective multiplicand input, between a first signal forcing said multiplicand input to be unsigned, and a second signal representing sign information for said multiplicand input.

* * * * *